United States Patent
Tsai et al.

(10) Patent No.: US 8,611,023 B2
(45) Date of Patent: Dec. 17, 2013

(54) PHOTOGRAPHING OPTICAL LENS ASSEMBLY

(75) Inventors: Tsung-Han Tsai, Taichung (TW); Ming-Ta Chou, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 13/417,581

(22) Filed: Mar. 12, 2012

(65) Prior Publication Data
US 2013/0038947 A1 Feb. 14, 2013

(30) Foreign Application Priority Data
Aug. 12, 2011 (TW) .............................. 100128935 A

(51) Int. Cl.
*G02B 13/18* (2006.01)
*G02B 3/02* (2006.01)
*G02B 21/02* (2006.01)

(52) U.S. Cl.
CPC ...................................... *G02B 13/18* (2013.01)
USPC .......................................... 359/714; 359/659

(58) Field of Classification Search
USPC ......... 359/745, 746, 713, 754, 763, 764, 797, 359/659, 714, 715
See application file for complete search history.

(56) References Cited

U.S. PATENT DOCUMENTS

| 7,365,920 B2 | 4/2008 | Noda | |
|---|---|---|---|
| 2013/0003193 A1* | 1/2013 | Huang | 359/713 |

\* cited by examiner

*Primary Examiner* — Scott J Sugarman
*Assistant Examiner* — Robert E Tallman
(74) *Attorney, Agent, or Firm* — Maschoff Brennan

(57) ABSTRACT

A photographing optical lens assembly comprising, in order from an object side to an image side, a first lens element with positive refractive power, a second lens element with negative refractive power, a third lens element with refractive power, a fourth lens element with positive refractive power and a plastic fifth lens element is mentioned. The third lens element comprises a convex object-side surface and a concave image-side surface. The fourth lens element comprises a convex object-side surface and a convex image-side surface. The fifth lens element comprises a concave image-side surface. The surfaces of the third and fifth lens elements are aspheric. The fifth lens element comprises at least one inflection point. By adjusting the refractive power of the third lens element, and adjusting the total length of the photographing optical lens assembly, the total volume of the lens assembly is reduced, and the image quality is improved.

24 Claims, 16 Drawing Sheets

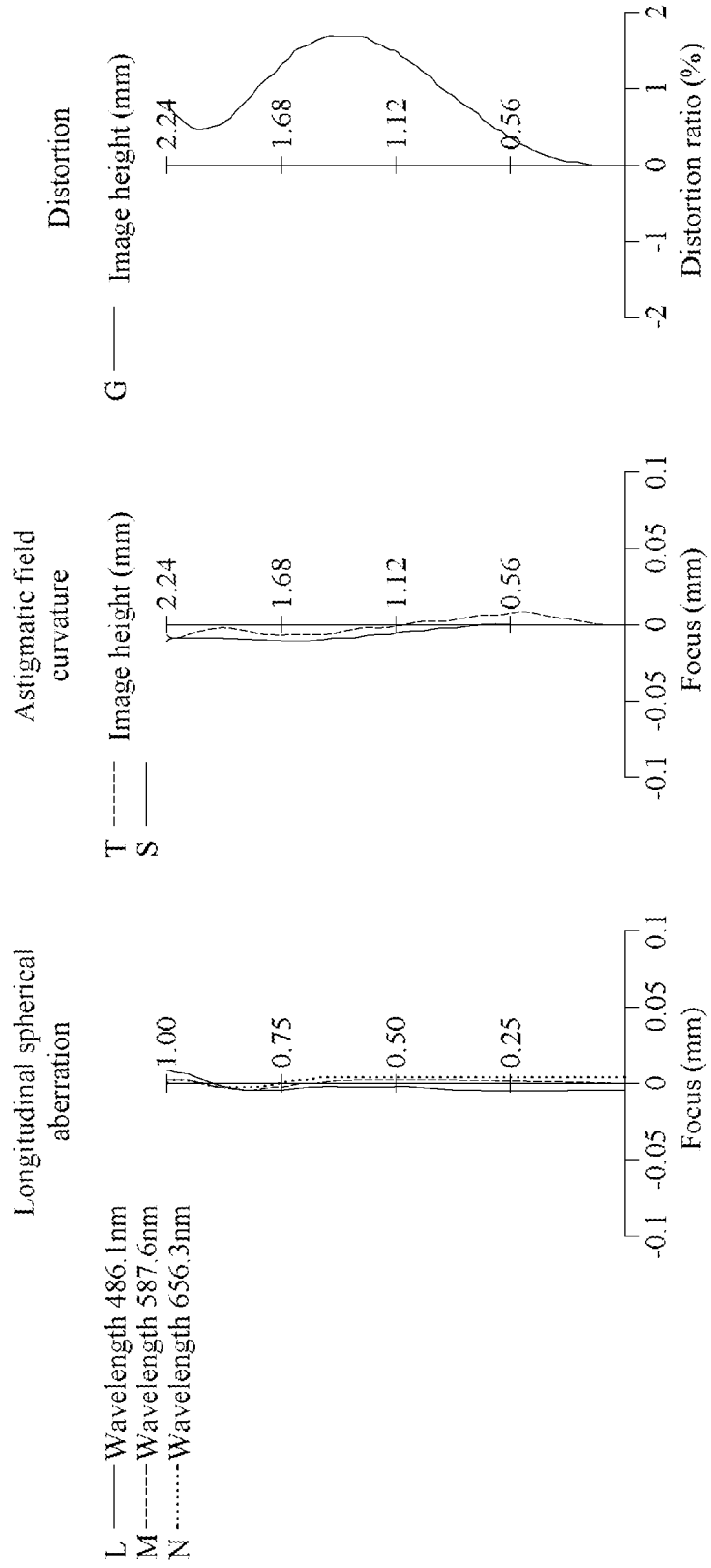

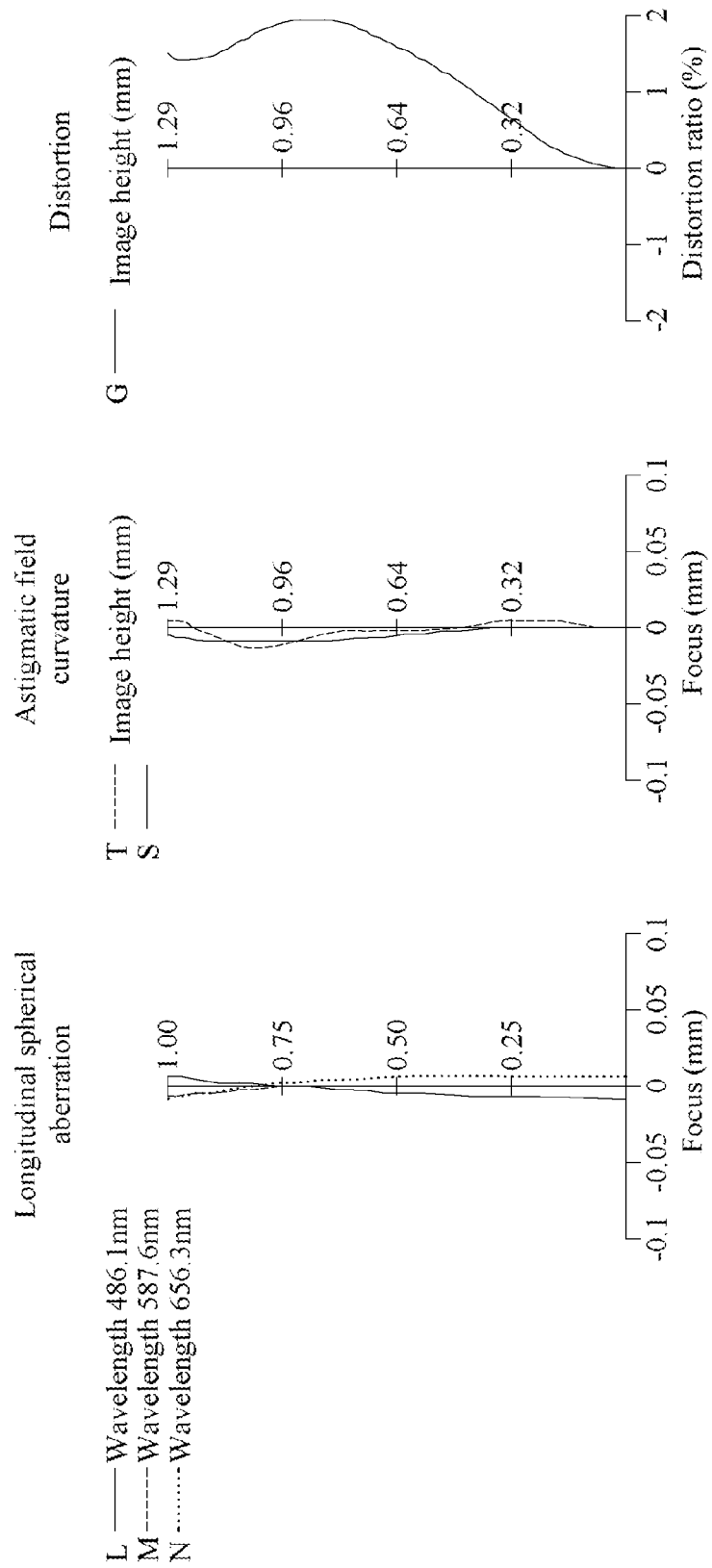

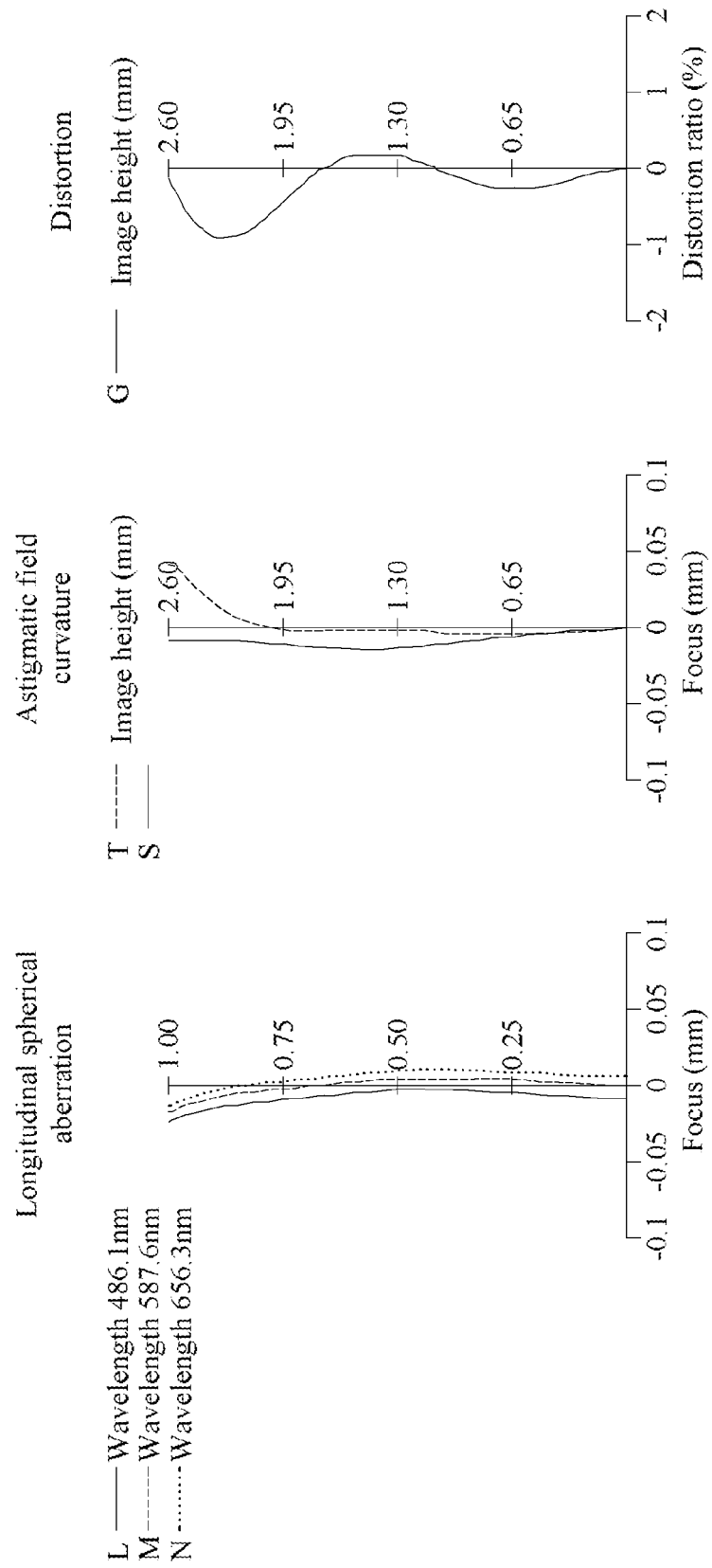

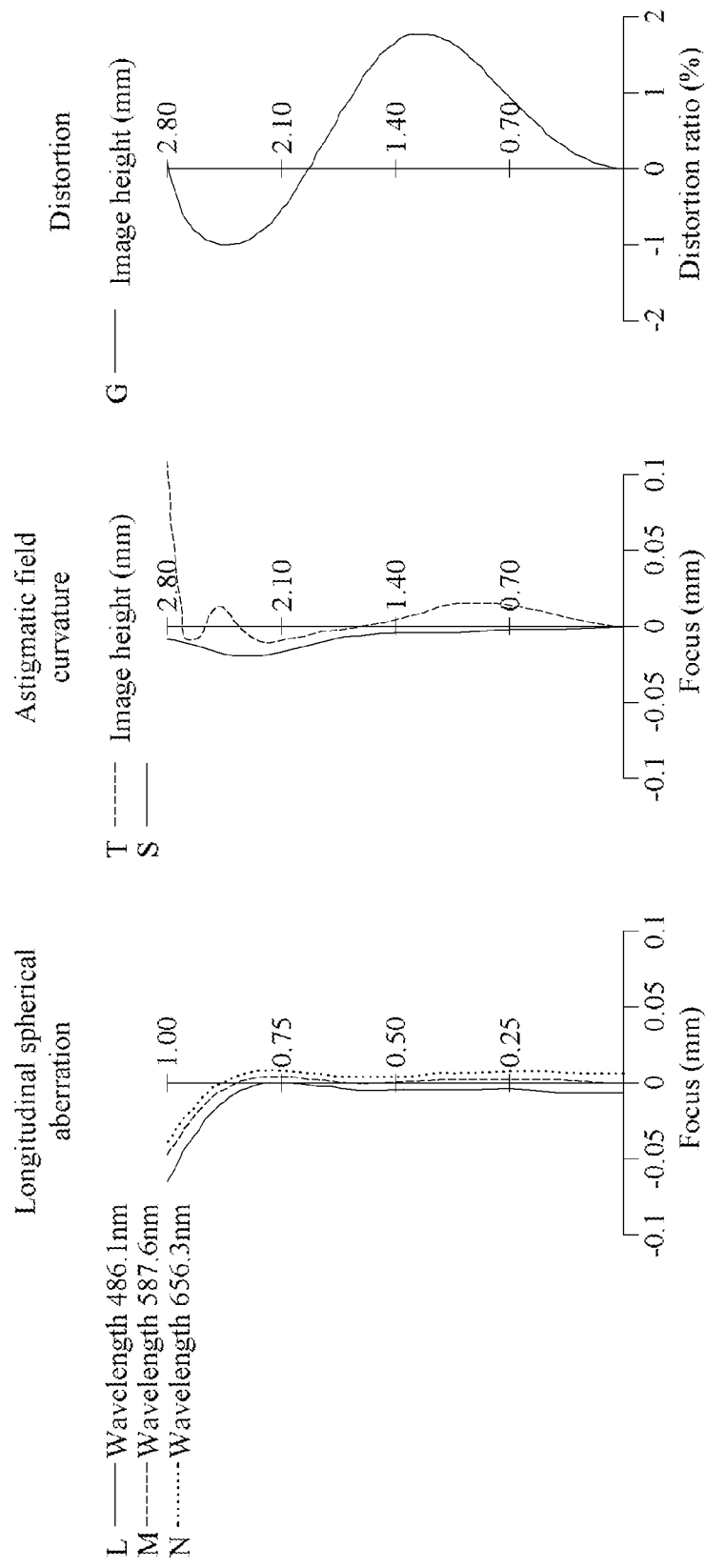

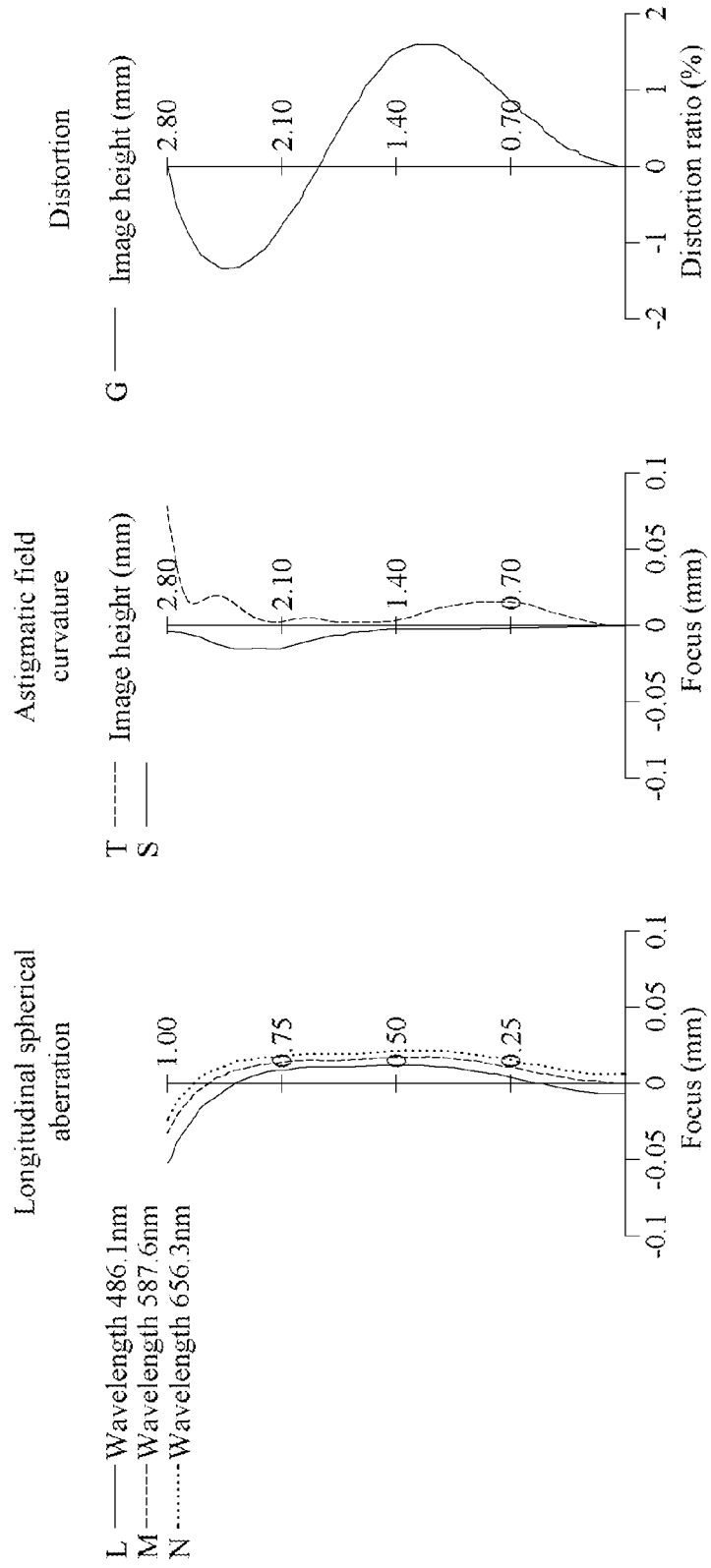

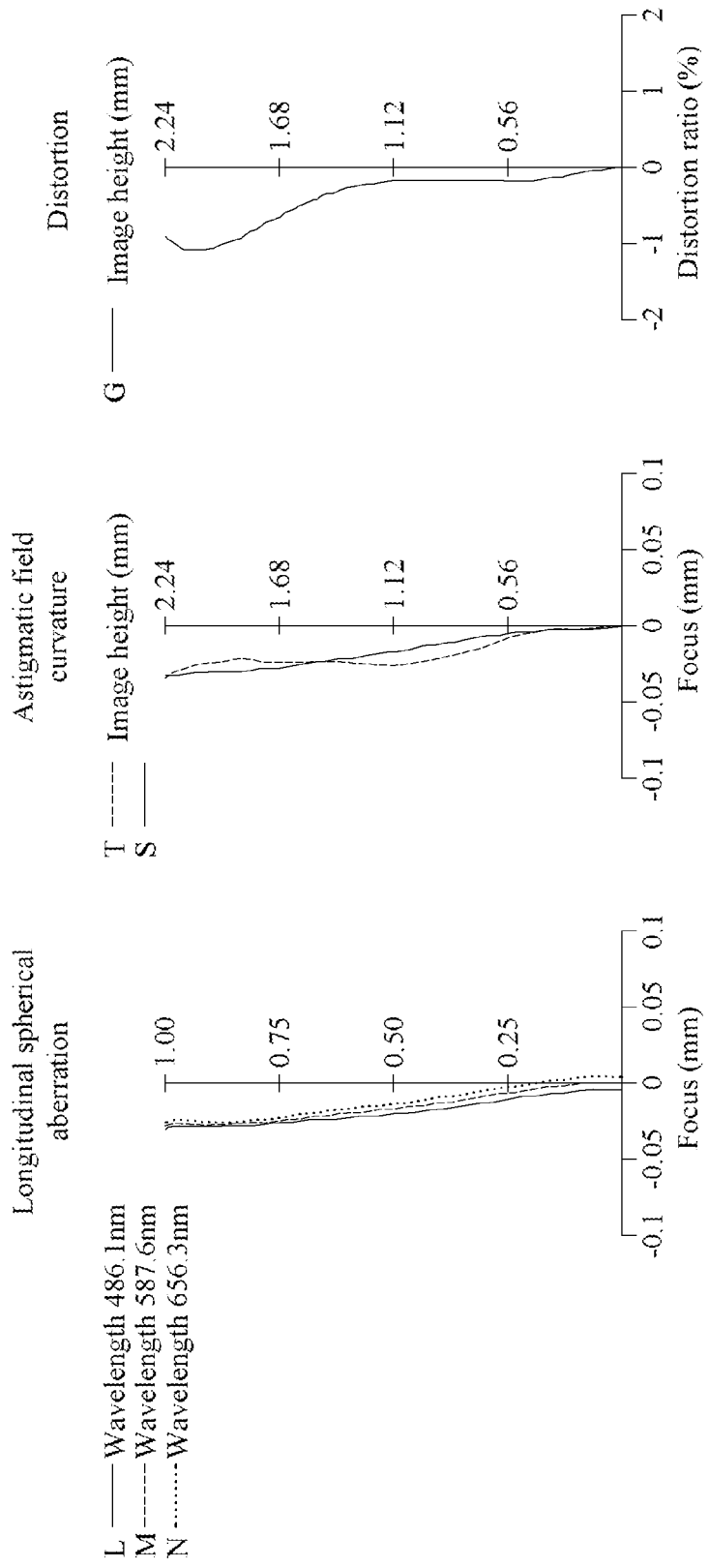

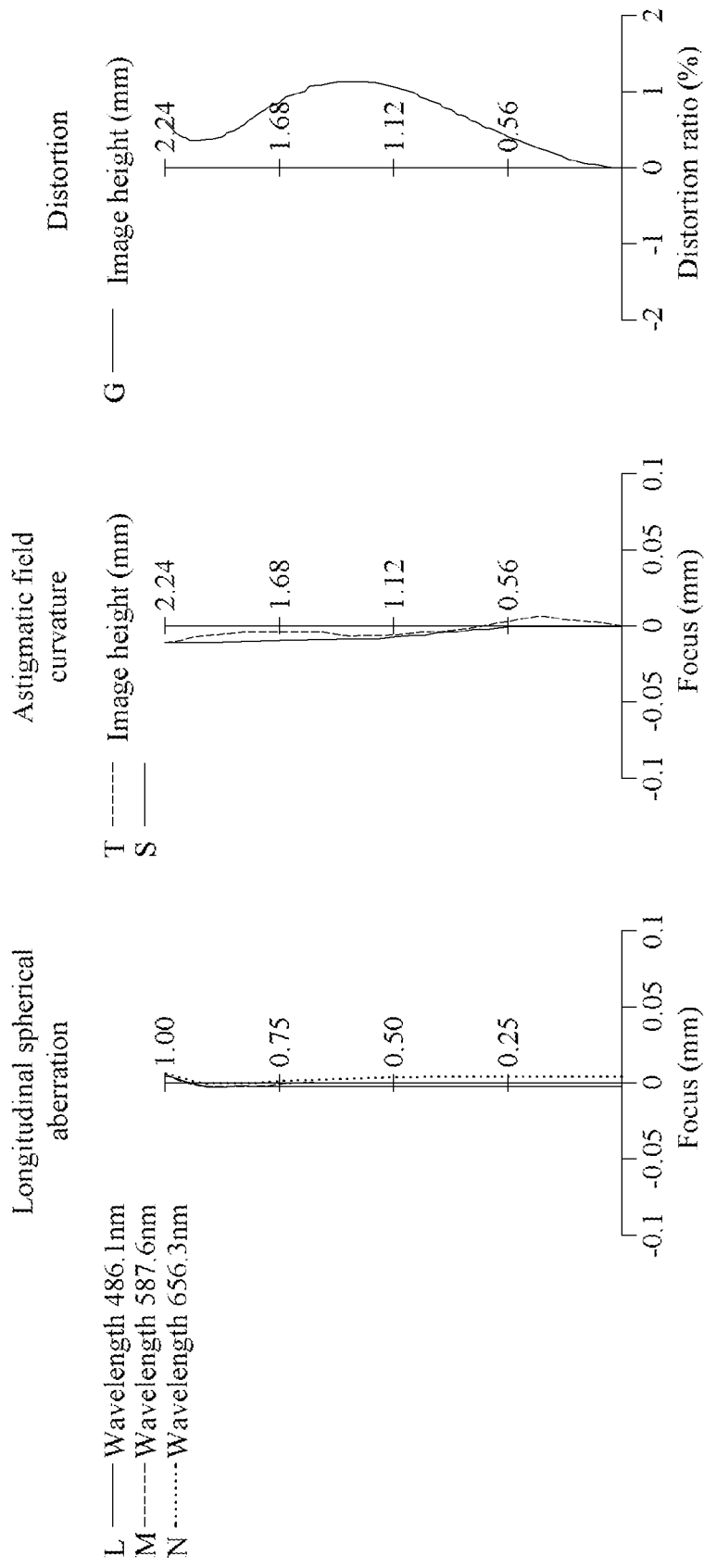

PHOTOGRAPHING OPTICAL LENS ASSEMBLY

CROSS-REFERENCE TO RELATED APPLICATIONS

This non-provisional application claims priority under 35 U.S.C. §119(a) on Patent Application No(s). 100128935 filed in Taiwan, R.O.C. on Aug. 12, 2011, the entire contents of which are hereby incorporated by reference.

BACKGROUND

1. Technical Field

The present disclosure relates to a photographing optical lens assembly, and more particularly to a photographing optical lens assembly having multiple lenses.

2. Related Art

In recent years, the demands for compact photographing cameras rise exponentially. The photo-sensing device, e.g. a sensor, of an ordinary photographing camera is commonly selected from a charge coupled device (CCD) and a complementary metal-oxide semiconductor (CMOS) device. In addition, with the advance of semiconductor manufacturing technology enabling the miniaturization of pixel size of sensors, there are increasing demands for compact optical lens assemblies capable of both being assembled in limited spaces as well as generating better quality images.

A conventional compact photographing lens used in a mobile electronic device usually consists of four lens elements, which is disclosed in U.S. Pat. No. 7,365,920. As the high-end mobile devices, such as smart phones or PDA (Personal Digital Assistant), gain in popularity, demands for the compact photographing lens with better resolution and image quality rise exponentially. However, the conventional four-lens assembly does not meet the requirement of the high-level photographing lens assembly. With the electronic devices heading towards the direction of better functionality while being as small and light as possible, the inventors recognize that optical imaging system capable of improving the image quality of mobile electronic devices as well as miniaturizing the overall size of the camera lens equipped therewith are urgently needed.

SUMMARY

According to an embodiment, a photographing optical lens assembly comprises, in order from an object side to an image side, a first lens element with positive refractive power, a second lens element with negative refractive power, a third lens element with refractive power, a fourth lens element with positive refractive power and a fifth lens element. The third lens element comprises a convex object-side surface and a concave image-side surface, and both the object-side surface and the image-side surface of the third lens element are aspheric. The fourth lens element comprises a convex object-side surface and a convex image-side surface. The fifth lens element is made of plastic and comprises an aspheric object-side surface, an aspheric concave image-side surface and at least one inflection point.

The photographing optical lens assembly satisfies the following conditions:

$|f/f_3|<0.65$; and  (Condition 1)

$0.1<T_{34}/T_{45}<2.7$;  (Condition 2)

wherein f is the focal length of the photographing lens assembly; $f_3$ is the focal length of the third lens element; $T_{34}$ is the axial distance between the third lens element and the fourth lens element; $T_{45}$ is the axial distance between the fourth lens element and the fifth lens element.

According to another embodiment, a photographing optical lens assembly comprises, in order from an object side to an image side: a first lens element with positive refractive power, a second lens element with negative refractive power, a third lens element with positive refractive power, a fourth lens element with positive refractive power and a fifth lens element with negative refractive power. The first lens element comprises a convex object-side surface. The third lens element comprises a convex object-side surface and a concave image-side surface. Both the object-side surface and the image-side surface of the third lens element are aspheric. The fourth lens element comprises a convex object-side surface and a convex image-side surface. The fifth lens element is made of plastic and comprises an aspheric object-side surface, an aspheric image-side surface and at least one inflection point.

The photographing optical lens assembly satisfies the following condition:

$0.1<T_{34}/T_{45}<2.7$;

wherein $T_{34}$ is the axial distance between the third lens element and the fourth lens element; $T_{45}$ is the axial distance between the fourth lens element and the fifth lens element.

According to yet another embodiment, a photographing optical lens assembly comprises, in order from an object side to an image side: a first lens element with positive refractive power, a second lens element with negative refractive power, a third lens element with refractive power, a fourth lens element with positive refractive power and a fifth lens element with negative refractive power. The third lens element comprises a convex object-side surface and a concave image-side surface. The object-side surface and the image-side surface of the third lens element are both aspheric. The fourth lens element comprises a convex object-side surface and a convex image-side surface. The fifth lens element is made of plastic and comprises an aspheric object-side surface and an aspheric concave image-side surface.

The photographing optical lens assembly satisfies the following condition:

$0<R_5/R_6<3.2$; and  (Condition 3)

0.30 millimeter (mm)$<CT_2+CT_3<0.72$ mm;  (Condition 4)

wherein $R_5$ is the curvature radius of the object-side surface of the third lens element; $R_6$ is the curvature radius of the image-side surface of the third lens element; $CT_2$ is the central thickness of the second lens element; and $CT_3$ is the central thickness of the third lens element.

BRIEF DESCRIPTION OF THE DRAWINGS

The present disclosure will become more fully understood from the following detailed description when taken in connection with the accompanying drawings, which show, for purpose of illustrations only, and thus do not limit other possible embodiments derived from the spirit of the present disclosure, and wherein:

FIG. 2B is a graph of longitudinal spherical aberration curves when the lights having wavelengths of 486.1 nm, 587.6 nm, and 656.3 nm are respectively projected in the photographing optical lens assembly in FIG. 2A;

FIG. 2C is a graph of astigmatic field curves when the light having the wavelength of 587.6 nm is projected in the photographing optical lens assembly in FIG. 2A;

FIG. 2D is a graph of a distortion curve when the light having the wavelength of 587.6 nm is projected in the photographing optical lens assembly;

FIG. 3B is a graph of longitudinal spherical aberration curves when the lights having wavelengths of 486.1 nm, 587.6 nm, and 656.3 nm are respectively projected in the photographing optical lens assembly in FIG. 3A;

FIG. 3C is a graph of astigmatic field curves when the light having the wavelength of 587.6 nm is projected in the photographing optical lens assembly in FIG. 3A;

FIG. 3D is a graph of a distortion curve when the light having the wavelength of 587.6 nm is projected in the photographing optical lens assembly in FIG. 3A;

FIG. 4B is a graph of longitudinal spherical aberration curves when the lights having wavelengths of 486.1 nm, 587.6 nm, and 656.3 nm are respectively projected in the photographing optical lens assembly in FIG. 4A;

FIG. 4C is a graph of astigmatic field curves when the light having the wavelength of 587.6 nm is projected in the photographing optical lens assembly in FIG. 4A;

FIG. 4D is a graph of a distortion curve when the light having the wavelength of 587.6 nm is projected in the photographing optical lens assembly in FIG. 4A;

FIG. 5B is a graph of longitudinal spherical aberration curves when the lights having wavelengths of 486.1 nm, 587.6 nm, and 656.3 nm are respectively projected in the photographing optical lens assembly in FIG. 5A;

FIG. 5C is a graph of astigmatic field curves when the light having the wavelength of 587.6 nm is projected in the photographing optical lens assembly in FIG. 5A;

FIG. 5D is a graph of a distortion curve when the light having the wavelength of 587.6 nm is projected in the photographing optical lens assembly in FIG. 5A;

FIG. 6B is a graph of longitudinal spherical aberration curves when the lights having wavelengths of 486.1 nm, 587.6 nm, and 656.3 nm are respectively projected in the photographing optical lens assembly in FIG. 6A;

FIG. 6C is a graph of astigmatic field curves when the light having the wavelength of 587.6 nm is projected in the photographing optical lens assembly in FIG. 6A;

FIG. 6D is a graph of a distortion curve when the light having the wavelength of 587.6 nm is projected in the photographing optical lens assembly in FIG. 6A;

FIG. 7B is a graph of longitudinal spherical aberration curves when the lights having wavelengths of 486.1 nm, 587.6 nm, and 656.3 nm are respectively projected in the photographing optical lens assembly in FIG. 7A;

FIG. 7C is a graph of astigmatic field curves when the light having the wavelength of 587.6 nm is projected in the photographing optical lens assembly in FIG. 7A;

FIG. 7D is a graph of a distortion curve when the light having the wavelength of 587.6 nm is projected in the photographing optical lens assembly in FIG. 7A;

FIG. 8B is a graph of longitudinal spherical aberration curves when the lights having wavelengths of 486.1 nm, 587.6 nm, and 656.3 nm are respectively projected in the photographing optical lens assembly in FIG. 8A;

FIG. 8C is a graph of astigmatic field curves when the light having the wavelength of 587.6 nm is projected in the photographing optical lens assembly in FIG. 8A; and FIG. 8D is a graph of a distortion curve when the light having the wavelength of 587.6 nm is projected in the photographing optical lens assembly in FIG. 8A.

DETAILED DESCRIPTION

Figure 1A:
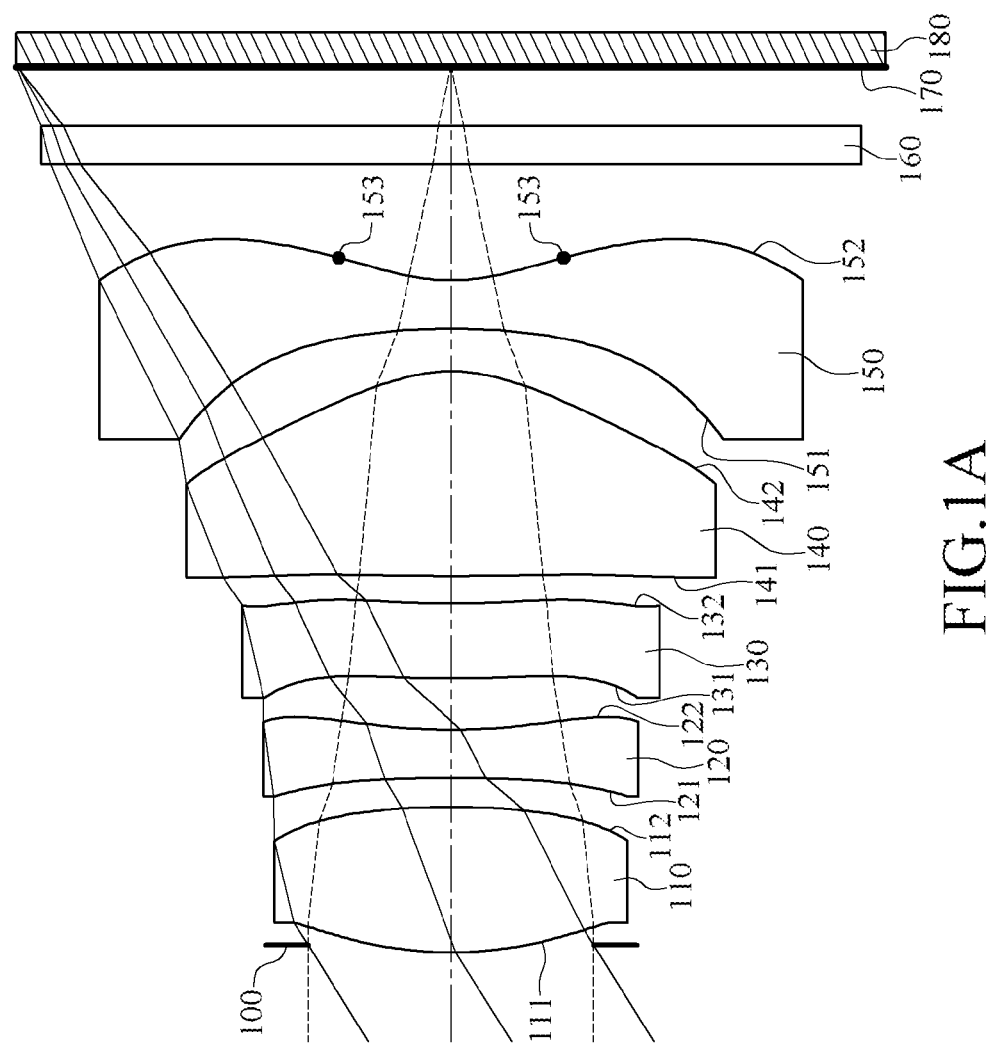
FIG. 1A is a schematic structural view of a first embodiment of a photographing optical lens assembly.

The photographing optical lens assembly of the present disclosure is described with FIG. 1A as an example to illustrate that the embodiments have similar lens combinations, configuration relationships, and the same conditions of the optical lens assembly. The differences are described in detail in the following embodiments other than the embodiment described in FIG. 1.

Taking FIG. 1A as an example, the photographing optical lens assembly 10 comprises, from an object side to an image side along an optical axis (from left to right in FIG. 1A) in sequence, a stop 100, a first lens element 110, a second lens element 120, a third lens element 130, a fourth lens element 140, a fifth lens element 150, an infrared-cut filter 160 and an image sensor 180 disposed on an image plane 170. There are air distances between any two of the first lens element 110, the second lens element 120, the third lens element 130, the fourth lens element 140 and the fifth lens element 150.

The first lens element 110 comprises an object-side surface 111 and an image-side surface 112. The refractive power of the first lens element 110 is positive for providing a part of the total refractive power needed by the photographing optical lens assembly 10, and, therefore, reducing the total optical length of the photographing optical lens assembly 10. In addition, when the object-side surface 111 is convex, the positive refractive power of the first lens element 110 rises which makes the total optical length of the photographing optical lens assembly 10 become shorter.

The second lens element 120 comprises an object-side surface 121 and an image-side surface 122. The refractive power of the second lens element 120 is negative for correcting the aberration of the photographing optical lens assembly 10.

The third lens element 130 comprises an object-side surface 131 and an image-side surface 132. In order to correct the high order aberration of the photographing optical lens assembly 10 and therefore, to enhance the image quality thereof, the object-side surface 131 is convex and the image-side surface 132 is concave. In this and several other embodiments, the refractive power of the third lens element 130 is negative for correcting the Petzval Sum of the photographing optical lens assembly 10. However, this embodiment is not intended to limit the disclosure. In some other embodiments, the refractive power of the third lens element 130 is positive for correcting the high order aberration.

The fourth lens element 140 comprises an object-side surface 141 and an image-side surface 142. The refractive power of the fourth lens element 140 is positive so the overall positive refractive power of the photographing optical lens assembly 10 is distributed to the first lens element 110 and the fourth lens element 140. Therefore, the sensitivity of the photographing optical lens assembly 10 is reduced. Both the object-side surface 141 and the image-side surface 142 are convex for increasing the positive refractive power of the fourth lens element 140. Accordingly, the overall positive refractive power of the photographing optical lens assembly 10 is distributed to the first lens element 110 and the fourth lens element 140, and therefore, the sensitivity of the photographing optical lens assembly 10 is further reduced.

The fifth lens element 150 comprises an object-side surface 151 and an image-side surface 152. When the image-side surface 152 is concave, the principle point of the photographing lens assembly 10 is far from the image plane 170 so the photographing lens assembly 10 is miniaturized. When the refractive power of the fifth lens element 150 is negative, a telephoto set of lens elements is formed by both the fourth lens element 140 with positive refractive power and the fifth lens element 150 so the total optical length of the photographing lens assembly 10 is shortened and therefore, the photographing lens assembly 10 remains small. In addition, in order to reduce the angle of incidence on the image sensor 172, and therefore, to correct the off-axis aberration, the fifth lens element, for example, comprises at least one inflection point 153.

The photographing lens assembly 10 satisfies the following conditions:

$|f/f_3|<0.65;$ (Condition 1)

$0.1<T_{34}/T_{45}<2.7;$ (Condition 2)

$0<R_5/R_6<3.2;$ and (Condition 3)

$0.30\ mm<CT_2+CT_3<0.72\ mm;$ (Condition 4)

wherein f is the focal length of the photographing lens assembly 10; $f_3$ is the focal length of the third lens element 130; $R_5$ is the curvature radius of the object-side surface 131 of the third lens element 130; $R_6$ is the curvature radius of the image-side surface 132 of the third lens element 130; $T_{34}$ is the axial distance between the third lens element 130 and the fourth lens element 140; $T_{45}$ is the axial distance between the fourth lens element 140 and the fifth lens element 150; $CT_2$ is the central thickness of the second lens element 120; and $CT_3$ is the central thickness of the third lens element 130.

When Condition 1 is satisfied, the refractive power of the third lens element 130 is well-designed for correcting the aberration as well as shortening the total optical length of the photographing lens assembly 10. In several embodiments, the photographing lens assembly 10 satisfies a condition: $|f/f_3|<0.35$.

When Condition 2 is satisfied, the axial distance between the third lens element 130 and the fourth lens element 140 as well as the axial distance between the fourth lens element 140 and fifth lens element 150 are well-designed for making the photographing lens assembly 10 small. In several embodiments, the photographing lens assembly 10 further satisfies a condition: $0.1<T_{34}/T_{45}<2.4$.

Satisfying Condition 3 is favorable for correcting the high order aberration and therefore, enhancing the image quality. In several embodiments, the photographing lens assembly 10 further satisfies a condition: $0<R_5/R_6<2.0$.

Satisfying Condition 4 makes the lenses of the photographing lens assembly 10 closer to each other so the photographing lens assembly 10 is miniaturized.

In this and several embodiments, the photographing lens assembly 10 further satisfies following conditions:

$0.2<f_4/f<0.9$ (condition 5)

$-1.2<f_5/f<-0.2$ (condition 6)

$0.1<R_{10}/f<0.6$ (condition 7)

$0.7<SD/TD<1.1$ (condition 8)

$30<V1-V2<42$ (condition 9)

$-1.0<(R1+R2)/(R1-R2)<0$ (condition 10)

Wherein $f_4$ is the focal length of the fourth lens element 140; $f_5$ is the focal length of the fifth lens element 150; $R_1$ is the curvature radius of the object-side surface 111 of the first lens element 110; $R_2$ is the curvature radius of the image-side surface 112 of the first lens element 110; $R_{10}$ is the curvature radius of the image-side surface 152 of fifth lens element 150; $V_1$ is the Abbe number of the first lens element 110; $V_2$ is the Abbe number of the second lens element 120; SD is the axial distance between the stop, such as an aperture stop 100, and the last surface of the last lens element of the photographing optical lens assembly 10, such as image-side surface 152 of the fifth lens element 150; TD is the axial distance between the object-side surface 111 of the first lens element 110 and the image-side surface 152 of the fifth lens element 150.

When Condition 5 is satisfied, the refractive power of the fourth lens element 140 is controlled well for correcting the aberration of the photographing optical lens assembly 10 and reducing the sensitivity of the photographing optical lens assembly 10.

When Condition 6 is satisfied, the refractive power of the fifth lens element 150 is well-designed for correcting aberration and therefore, enhancing the image quality.

Satisfying Condition 7 is favorable for making the principle point far from the image plane 170, and therefore, shortening the total optical length of the photographing optical lens assembly 10.

Satisfying Condition 8 is favorable for reaching a good balance between the telecentricity and the wide-angle view feature of the photographing optical lens assembly 10.

Satisfying Condition 9 is favorable for the chromatism correction of the photographing optical lens assembly 10.

Satisfying Condition 10 is favorable for correcting the spherical aberration of the photographing optical lens assembly 10.

In this and several embodiments, in order to reduce manufacturing costs, the third lens element 130, the fourth lens element 140 and the fifth lens element 150 are made of plastic. In addition, in this and several other embodiments, the surfaces of the third lens element 130, the fourth lens element 140 and the fifth lens element 150 are aspheric. Since aspheric profiles allow more design-parameter freedom for the aberration correction, the total optical length of the photographing optical lens assembly 10 can be shortened effectively.

In addition, in the photographing optical lens assembly, a convex surface means the surface at a paraxial site is convex; a concave surface means a surface at a paraxial site is concave.

Furthermore, for eliminating the stray light to improve the image quality or limiting the object image to a desirable size, at least one stop, such as a glare stop or field stop, may be disposed in the photographing optical lens assembly.

As for the photographing optical lens assembly 10, more details are further described with the following embodiments. Parameters in the embodiments are defined as follows. Fno is an f-number value of the photographing optical lens assembly 10, and HFOV is half of maximal field of view in the photographing optical lens assembly 10. The aspheric surface in the embodiments may be represented by, but not limited to, the following aspheric surface equation (Condition ASP):

$$X(Y) = (Y^2/R) / \left(1 + sqrt(1 - (1+k)*(Y/R)^2)\right) + \sum_i (Ai)*(Y^i)$$

Wherein Y is the distance from the point on the curve of the aspheric surface to the optical axis, X is the distance of a point on the aspheric surface at a distance Y from the optical axis relative to the tangential plane at the aspheric surface vertex, k is a conic factor, Ai is an $i^{th}$ order aspheric surface coefficient, and in the embodiments, i may be, but is not limited to, 4, 6, 8, 10, 12, 14 and 16.

The First Embodiment (Embodiment 1)

FIG. 1A is a schematic structural view of the first embodiment of the photographing optical lens assembly. The photographing optical lens assembly 10 comprises, from the object side to the image side along the optical axis (from left to right in FIG. 1A) in sequence, the stop 100, the first lens element 110, the second lens element 120, the third lens element 130, the fourth lens element 140, the fifth lens element 150, the infrared-cut filter 160 and the image sensor 172 disposed on the image plane 170. There are air distances between any two of the first lens element 110, the second lens element 120, the third lens element 130, the fourth lens element 140 and the fifth lens element 150. In this embodiment, the stop 100 is, for example, an aperture stop.

In this embodiment, light having the reference wavelength of 587.6 nm is projected in the photographing optical lens assembly 10. However, the reference wavelength of the light does not intend to limit the disclosure. In several embodiments, light with different wavelength is used based on various demands.

In this embodiment, the refractive power of the first lens element 110 is positive; the refractive power of the second lens element 120 is negative; the refractive power of the third lens element 130 is negative; the refractive power of the fourth lens element 140 is positive; the refractive power of the fifth lens element 150 is negative. Besides, the object-side surface 111 of the first lens element 110 is convex; the object-side surface 131 of the third lens element 130 is convex; the image-side surface 132 of the third lens element 130 is concave; the object-side surface 141 of the fourth lens element 140 is convex; the image-side surface 142 of the fourth lens element 140 is convex; the image-side surface 152 of the fifth lens element 150 is concave. The fifth lens element further comprises at least one inflection point 153.

The detailed data of the photographing optical lens assembly 10 is as shown in Table 1-1 below:

TABLE 1-1

Embodiment 1
f = 3.55, Fno = 2.40, HFOV = 32.0 deg.

| Surface # | | Curvature radius (mm) | Thickness (mm) | Material | Index | Abbe # | Focal length (mm) |
|---|---|---|---|---|---|---|---|
| 0 | Object | Plano | Infinity | | | | |
| 1 | Ape. Stop | Plano | −0.038 | | | | |
| 2 | Lens 1 | 1.927730 (ASP) | 0.753 | Plastic | 1.544 | 55.9 | 2.54 |
| 3 | | −4.213700 (ASP) | 0.149 | | | | |
| 4 | Lens 2 | −11.405500 (ASP) | 0.252 | Plastic | 1.634 | 23.8 | −3.50 |
| 5 | | 2.779340 (ASP) | 0.265 | | | | |
| 6 | Lens 3 | 5.102800 (ASP) | 0.389 | Plastic | 1.634 | 23.8 | −95.16 |
| 7 | | 4.565700 (ASP) | 0.142 | | | | |
| 8 | Lens 4 | 15.743100 (ASP) | 1.062 | Plastic | 1.544 | 55.9 | 1.50 |
| 9 | | −0.842880 (ASP) | 0.221 | | | | |
| 10 | Lens 5 | −3.666700 (ASP) | 0.250 | Plastic | 1.535 | 56.3 | −1.34 |
| 11 | | 0.913580 (ASP) | 0.600 | | | | |
| 12 | IR-cut filter | Plano | 0.200 | Glass | 1.517 | 64.2 | — |
| 13 | | Plano | 0.304 | | | | |
| 14 | Image sensor | Plano | — | | | | |

Note:
Reference wavelength is d-line 587.6 nm, and ASP represents aspheric.

In Table 1-1, from the object-side surface 111 to the image-side surface 152, all the surfaces can be aspheric, and the aspheric surfaces can satisfy Condition ASP, but are not limited thereto. As for the parameters of the aspheric surfaces, reference is made to Table 1-2 below:

TABLE 1-2

Aspheric Coefficients

| | Surface# | | | | |
|---|---|---|---|---|---|
| | 2 | 3 | 4 | 5 | 6 |
| K | −1.09321E+01 | −2.00000E+01 | −9.90560E+00 | −9.77634E+00 | −5.87543E−01 |
| $A_4$ | 1.64303E−01 | −6.57932E−02 | −6.20850E−02 | −5.59155E−02 | −1.72115E−01 |
| $A_6$ | −2.24666E−01 | −8.85165E−02 | −1.29552E−01 | −4.85931E−02 | −1.24480E−01 |

TABLE 1-2-continued

| Aspheric Coefficients | | | | | |
|---|---|---|---|---|---|
| $A_8$ | 1.93191E−01 | 1.20674E−03 | 3.58122E−01 | 1.65626E−01 | 2.93709E−01 |
| $A_{10}$ | −1.58293E−01 | 8.53580E−02 | −6.91662E−01 | −4.24748E−01 | −3.88137E−01 |
| $A_{12}$ | 3.40938E−02 | −8.40824E−02 | 8.26486E−01 | 3.92203E−01 | 1.73249E−01 |
| $A_{14}$ | −2.44535E−02 | 1.76471E−03 | −3.89736E−01 | −1.45061E−01 | −1.15705E−03 |

| | Surface# | | | | |
|---|---|---|---|---|---|
| | 7 | 8 | 9 | 10 | 11 |
| K | −1.00000E+00 | −1.00000E+00 | −4.61709E+00 | 1.22506E+00 | −7.63370E+00 |
| $A_4$ | −1.49285E−01 | −3.93985E−02 | −7.47507E−02 | −1.96410E−02 | −9.31878E−02 |
| $A_6$ | −7.86212E−02 | 5.60894E−02 | 1.39587E−01 | −5.99107E−02 | 3.17037E−02 |
| $A_8$ | 1.29250E−01 | −2.13772E−01 | −1.29519E−01 | 3.35727E−02 | −1.09974E−02 |
| $A_{10}$ | −6.37238E−02 | 3.01421E−01 | 6.53366E−02 | −8.23674E−03 | 2.09754E−03 |
| $A_{12}$ | 4.75671E−02 | −1.73006E−01 | −1.70950E−02 | −1.81190E−03 | −2.35096E−04 |
| $A_{14}$ | −1.02505E−02 | 3.56235E−02 | 1.39077E−03 | 9.60538E−04 | 2.01072E−05 |

In Table 1-1, the curvature radius, the thickness and the focal length are shown in millimeters (mm). Surface numbers 0-14 represent the surfaces sequentially arranged from the object-side to the image-side along the optical axis. "f" stands for the focal length, "Fno" is the f-number, and "HFOV" is half of maximal field of view of this embodiment. In Table 1-2, k represents the conic coefficient of the equation of the aspheric surface profiles. $A_1$-$A_{14}$ represent the aspheric coefficients ranging from the 1st order to the $14^{th}$ order. All labels for Tables of the remaining embodiments share the same definitions as those in Table 1-1 and Table 1-2 of the first embodiment, and their definitions will not be stated again.

The content of Table 1-3 may be deduced from Table 1-1:

TABLE 1-3

| Embodiment 1 | | | |
|---|---|---|---|
| f (mm) | 3.55 | $R_5/R_6$ | 1.12 |
| f-number | 2.40 | $R_{10}/f$ | 0.26 |
| HFOV (deg.) | 32.0 | $|f/f_3|$ | 0.04 |
| $V_1 - V_2$ | 32.1 | $f_4/f$ | 0.42 |
| $CT_2 + CT_3$ (mm) | 0.64 | $f_5/f$ | −0.38 |
| $T_{34}/T_{45}$ | 0.64 | SD/TD | 0.99 |
| $(R_1 + R_2)/(R_1 - R_2)$ | −0.37 | | |

It can be observed from Table 1-3 that $|f/f_3|$ equals 0.04 which satisfies Condition 1; $T_{34}/T_{45}$ equals 0.64 which satisfies Condition 2; $R_5/R_6$ equals 1.12 which satisfies Condition 3; $CT_2+CT_3$ equals 0.64 which satisfies Condition 4; $f_4/f$ equals 0.42 which satisfies Condition 5.

$f_5/f$ equals −0.38 which satisfies Condition 6; $R_{10}/f$ equals 0.26 which satisfies Condition 7; SD/TD equals 0.99 which satisfies Condition 8; $V_1-V_2$ equals 32.1 which satisfies Condition 9; $(R_1+R_2)/(R_1-R_2)$ equals −0.37 which satisfies Condition 10.

Figures 1B, 1C, 1D:
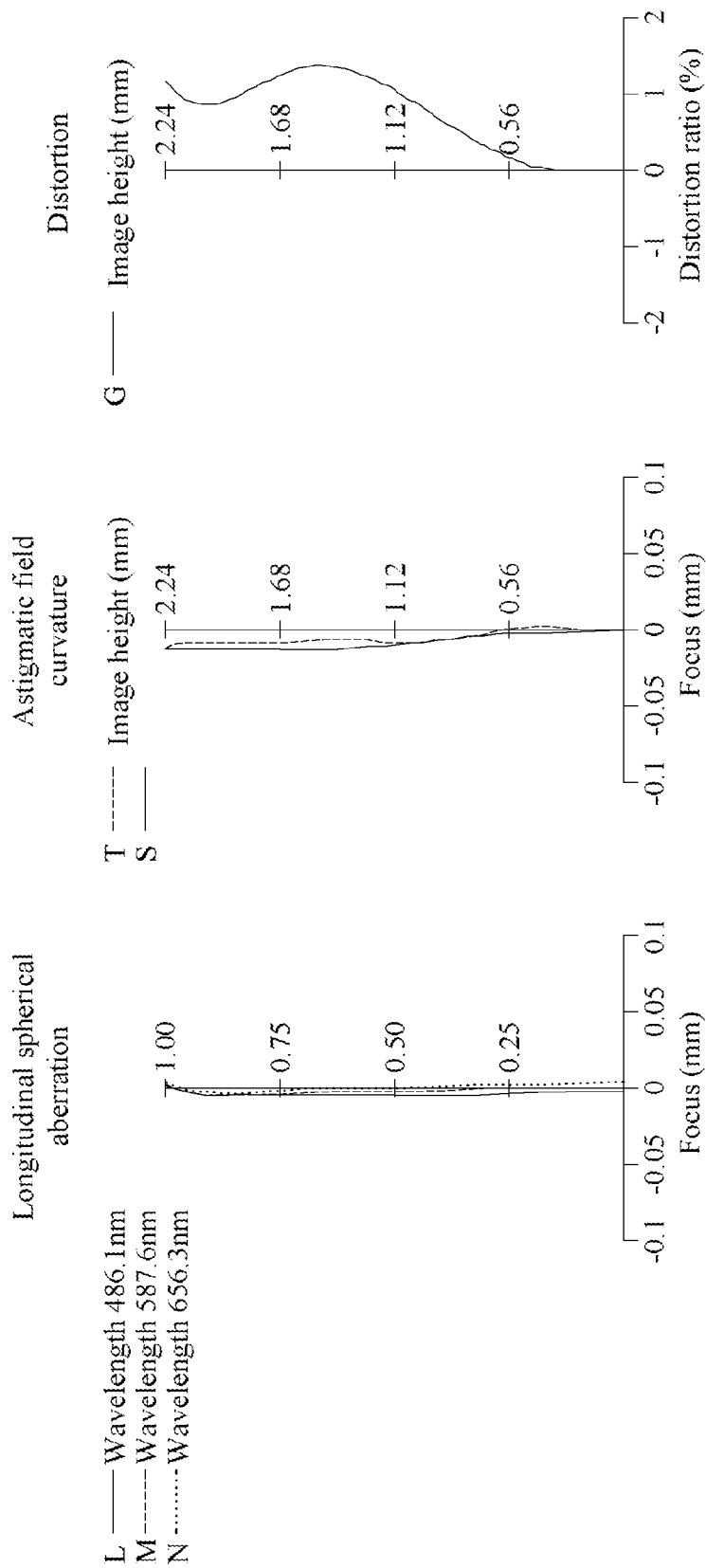
FIG. 1B is a graph of longitudinal spherical aberration curves when the lights having wavelengths of 486.1 nm, 587.6 nm, and 656.3 nm are respectively projected in the photographing optical lens assembly in FIG. 1A.
FIG. 1C is a graph of astigmatic field curves when the light having the wavelength of 587.6 nm is projected in the photographing optical lens assembly in FIG. 1A.
FIG. 1D is a graph of a distortion curve when the light having the wavelength of 587.6 nm is projected in the photographing optical lens assembly in FIG. 1A.

FIG. 1B is a graph of longitudinal spherical aberration curves when the lights having wavelengths of 486.1 nm, 587.6 nm, and 656.3 nm are respectively projected in the photographing optical lens assembly 10 in FIG. 1A. The longitudinal spherical aberration curve of the light having the wavelength of 486.1 nm, 587.6 nm, and 656.3 nm in the photographing optical lens assembly 10 are indicated by lines L, M, N respectively in FIG. 1B. Horizontal axis is the focus position (millimeter, mm), and vertical axis is the normalized entrance pupil or aperture value.

FIG. 1C is a graph of astigmatic field curves with light entry of 587.6 nm reference wavelength in FIG. 1A. Respective curve values on the tangential plane (T) and the sagittal plane (S) are shown in FIG. 1C with the horizontal axis being the focus position (mm), and the vertical axis being the image height (mm).

FIG. 1D is a graph of a distortion curve with light entry of 587.6 nm reference wavelength in FIG. 1A. The horizontal axis is the distortion ratio (%), and the vertical axis is the image height (mm).

In the graphs of various aberration curves in FIGS. 2B-8B, 2C-8C, and 2D-8D from the second to the eighth embodiments, similar graph labeling are used as in the first embodiment and will not be repeated herein for conciseness.

The Second Embodiment (Embodiment 2)

Figure 2A:
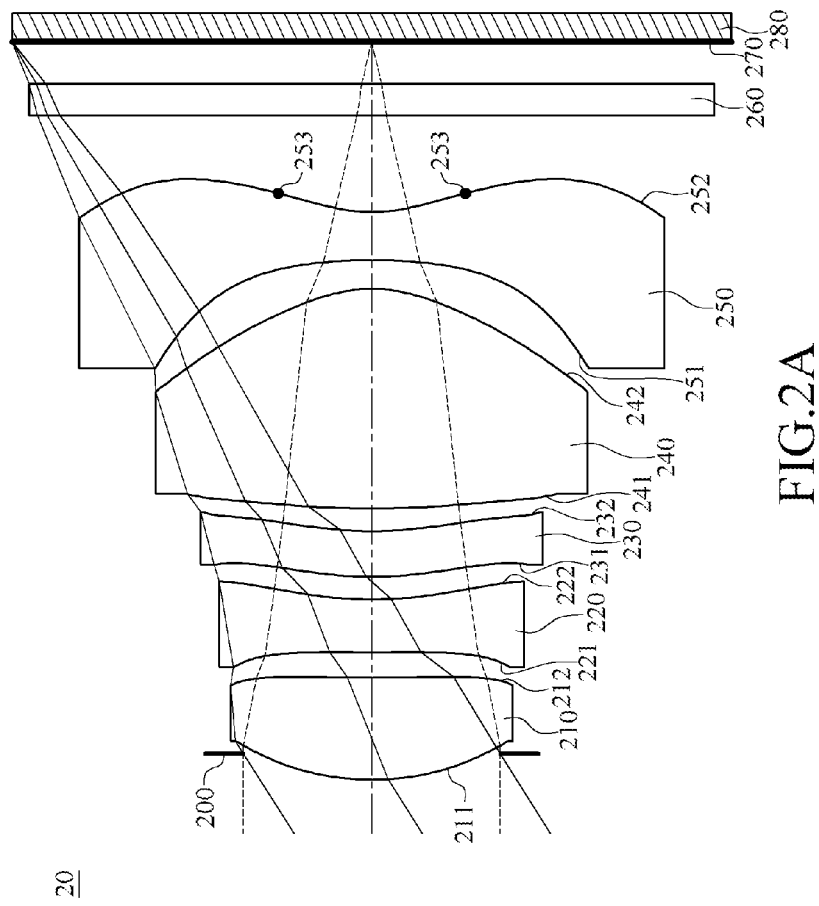
FIG. 2A is a schematic structural view of a second embodiment of a photographing optical lens assembly.

FIG. 2A is a schematic structural view of the second embodiment of the photographing optical lens assembly. The specific implementation and elements of the second embodiment are substantially the same as those in the first embodiment. The element symbols in the second embodiment all begin with "2" which correspond to those in the first embodiment with the same function or structure. For conciseness, only the differences are illustrated below, and the similarities will not be repeated herein.

In this embodiment, for example, the reference wavelength of the light received by the photographing optical lens assembly 20 is 587.6 nm, but this reference wavelength may be adjusted according to actual requirements, and is not limited to the wavelength value mentioned above.

In this embodiment, a first lens element 210 with positive refractive power comprises a convex object-side surface 211. A second lens element 220 has negative refractive power. A third lens element 230 with positive refractive power comprises a convex object-side surface 231 and a concave image-side surface 232. A fourth lens element 240 with positive refractive power comprises a convex object-side surface 241 and a convex image-side surface 242. A fifth lens element 250 with negative refractive power comprises a concave image-side surface 252 and at least one inflection point 253.

The detailed data of the photographing optical lens assembly 20 is as shown in Table 2-1 below:

TABLE 2-1

Embodiment 2
f = 3.52, Fno = 2.20, HFOV = 32.3 deg.

| Surface # | | Curvature radius (mm) | Thickness (mm) | Material | Index | Abbe # | Focal length (mm) |
|---|---|---|---|---|---|---|---|
| 0 | Object | Plano | Infinity | | | | |
| 1 | Ape. Stop | Plano | −0.163 | | | | |
| 2 | Lens 1 | 1.625660 (ASP) | 0.636 | Plastic | 1.544 | 55.9 | 3.18 |
| 3 | | 23.121400 (ASP) | 0.157 | | | | |
| 4 | Lens 2 | 33.885600 (ASP) | 0.331 | Plastic | 1.640 | 23.3 | −3.88 |
| 5 | | 2.302050 (ASP) | 0.141 | | | | |
| 6 | Lens 3 | 2.110750 (ASP) | 0.285 | Plastic | 1.544 | 55.9 | 32.66 |
| 7 | | 2.281300 (ASP) | 0.141 | | | | |
| 8 | Lens 4 | 5.648600 (ASP) | 1.372 | Plastic | 1.535 | 56.3 | 1.48 |
| 9 | | −0.839380 (ASP) | 0.177 | | | | |
| 10 | Lens 5 | −3.833100 (ASP) | 0.300 | Plastic | 1.535 | 56.3 | −1.33 |
| 11 | | 0.894640 (ASP) | 0.600 | | | | |
| 12 | IR-cut filter | Plano | 0.200 | Glass | 1.517 | 64.2 | — |
| 13 | | Plano | 0.262 | | | | |
| 14 | Image sensor | Plano | — | | | | |

Note:
Reference wavelength is d-line 587.6 nm, and ASP represents aspheric.

In Table 2-1, from the object-side surface 211 to the image-side surface 252, all the surfaces can be aspheric, and the aspheric surfaces can satisfy Condition ASP, but are not limited thereto. As for the parameters of the aspheric surfaces, reference is made to Table 2-2 below.

TABLE 2-2

Aspheric Coefficients

| Surface# | | | | | |
|---|---|---|---|---|---|
| | 2 | 3 | 4 | 5 | 6 |
| K | −7.10592E+00 | −1.00000E+00 | −2.00000E+01 | −7.93898E+00 | −2.17779E−01 |
| $A_4$ | 2.15140E−01 | −2.23190E−02 | −1.07172E−01 | −4.31192E−02 | −1.90672E−01 |
| $A_6$ | −1.79989E−01 | −2.82278E−02 | −7.66487E−02 | −1.67402E−02 | −4.34381E−02 |
| $A_8$ | 1.93040E−01 | −9.22139E−02 | 1.76192E−01 | 1.63943E−01 | 2.82914E−01 |
| $A_{10}$ | −1.29890E−01 | 5.23149E−02 | −6.90089E−01 | −4.50011E−01 | −4.02880E−01 |
| $A_{12}$ | 3.41999E−02 | −8.40781E−02 | 8.26466E−01 | 4.35152E−01 | 1.99780E−01 |
| $A_{14}$ | −2.42747E−02 | 1.78025E−03 | −3.89762E−01 | −1.45067E−01 | −2.05908E−02 |

| Surface# | | | | | |
|---|---|---|---|---|---|
| | 7 | 8 | 9 | 10 | 11 |
| K | −9.62428E−01 | −1.00000E+00 | −4.84193E+00 | 2.67056E+00 | −7.49164E+00 |
| $A_4$ | −1.30866E−01 | −1.51088E−02 | −1.03449E−01 | −8.60640E−02 | −1.06739E−01 |
| $A_6$ | −7.42532E−02 | 3.07202E−02 | 1.22672E−01 | −4.70149E−02 | 3.93416E−02 |
| $A_8$ | 1.26526E−01 | −2.14144E−01 | −1.24670E−01 | 3.17395E−02 | −1.31631E−02 |
| $A_{10}$ | −6.58647E−02 | 3.10583E−01 | 6.75383E−02 | −1.02564E−02 | 2.10242E−03 |
| $A_{12}$ | 4.18254E−02 | −1.68513E−01 | −1.67490E−02 | −1.79212E−03 | −1.28308E−04 |
| $A_{14}$ | −1.02045E−02 | 3.23821E−02 | 1.34082E−03 | 1.42931E−03 | 7.91903E−06 |

The content of Table 2-3 may be deduced from Table 2-1.

TABLE 2-3

Embodiment 2

| f (mm) | 3.52 | $R_5/R_6$ | 0.93 |
|---|---|---|---|
| f-number | 2.20 | $R_{10}/f$ | 0.25 |
| HFOV (deg.) | 32.3 | $|f/f_3|$ | 0.11 |
| $V_1 - V_2$ | 32.6 | $f_4/f$ | 0.42 |
| $CT_2 + CT_3$ (mm) | 0.62 | $f_5/f$ | −0.38 |
| $T_{34}/T_{45}$ | 0.80 | SD/TD | 0.95 |
| $(R_1 + R_2)/(R_1 - R_2)$ | −1.15 | | |

FIG. 2B is a graph of longitudinal spherical aberration curves when the lights having wavelengths of 486.1 nm (L), 587.6 nm (M), and 656.3 nm (N) are projected in the photographing optical lens assembly 20 in FIG. 2A.

FIG. 2C is a graph of astigmatic field curves with light entry of 587.6 nm reference wavelength in FIG. 2A FIG. 2D is a graph of a distortion curve with light entry of 587.6 nm reference wavelength in FIG. 2A.

The Third Embodiment (Embodiment 3)

Figure 3A:
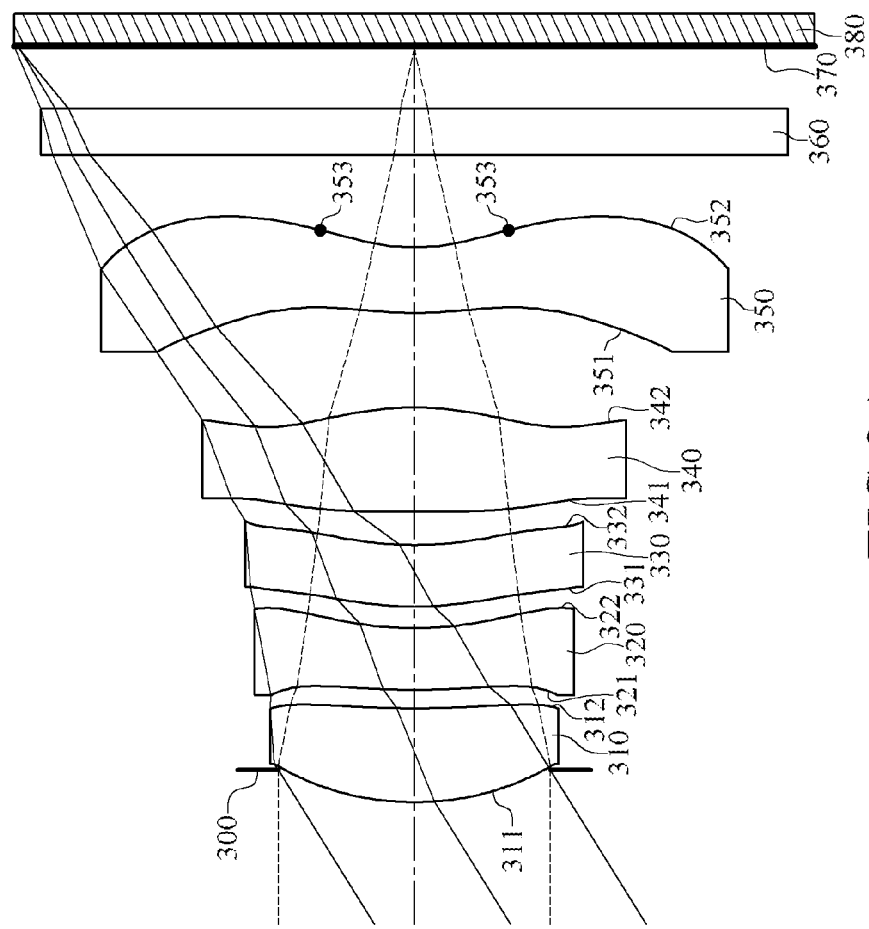
FIG. 3A is a schematic structural view of a third embodiment of an photographing optical lens assembly.

FIG. 3A is a schematic structural view of the third embodiment of the photographing optical lens assembly. The specific implementation and elements of the third embodiment are substantially the same as those in the first embodiment. The element symbols in the third embodiment all begin with "3" which correspond to those in the first embodiment with the same function or structure. For conciseness, only the differences are illustrated below, and the similarities will not be repeated herein.

In this embodiment, for example, the reference wavelength of the light received by the photographing optical lens assembly 30 is 587.6 nm, but the reference wavelength may be adjusted according to actual requirements, and is not limited to the wavelength value mentioned above.

In this embodiment, a first lens element 310 with positive refractive power comprises a convex object-side surface 311. A second lens element 320 has negative refractive power. A third lens element 330 with positive refractive power comprises a convex object-side surface 331 and a concave image-side surface 332. A fourth lens element 340 with positive refractive power comprises a convex object-side surface 341 and a convex image-side surface 342. A fifth lens element 350 with negative refractive power comprises a concave image-side surface 352 and at least one inflection point 353.

The detailed data of the photographing optical lens assembly 30 is as shown in Table 3-1 below.

TABLE 3-1

Embodiment 3
f = 2.03, Fno = 2.30, HFOV = 32.0 deg.

| Surface # | | Curvature radius (mm) | Thickness (mm) | Material | Index | Abbe # | Focal length (mm) |
|---|---|---|---|---|---|---|---|
| 0 | Object | Plano | Infinity | | | | |
| 1 | Ape. Stop | Plano | −0.104 | | | | |
| 2 | Lens 1 | 0.900160 (ASP) | 0.305 | Plastic | 1.544 | 55.9 | 2.19 |
| 3 | | 3.230400 (ASP) | 0.060 | | | | |
| 4 | Lens 2 | 2.469860 (ASP) | 0.200 | Plastic | 1.650 | 21.4 | −2.95 |
| 5 | | 1.044640 (ASP) | 0.070 | | | | |
| 6 | Lens 3 | 1.021560 (ASP) | 0.200 | Plastic | 1.607 | 26.6 | 16.86 |
| 7 | | 1.050840 (ASP) | 0.108 | | | | |
| 8 | Lens 4 | 13.594300 (ASP) | 0.339 | Plastic | 1.544 | 55.9 | 1.81 |
| 9 | | −1.054010 (ASP) | 0.307 | | | | |
| 10 | Lens 5 | 1.176730 (ASP) | 0.213 | Plastic | 1.544 | 55.9 | −2.34 |
| 11 | | 0.572400 (ASP) | 0.300 | | | | |
| 12 | IR-cut filter | Plano | 0.150 | Glass | 1.517 | 64.2 | — |
| 13 | | Plano | 0.204 | | | | |
| 14 | Image sensor | Plano | — | | | | |

Note:
Reference wavelength is d-line 587.6 nm, and ASP represents aspheric.

In Table 3-1, from the object-side surface 311 to the image-side surface 352, all surfaces can be aspheric, and the aspheric surfaces can satisfy Condition ASP, but are not limited thereto. As for the parameters of the aspheric surfaces, reference is made to Table 3-2 below.

TABLE 3-2

Aspheric Coefficients

| | Surface# | | | | |
|---|---|---|---|---|---|
| | 2 | 3 | 4 | 5 | 6 |
| K | −5.93154E−01 | −1.68114E+01 | −2.10813E+01 | −2.95246E+00 | −6.22822E+00 |
| $A_4$ | 1.01419E−01 | −2.07505E−01 | −3.42269E−01 | −3.55894E−01 | −7.01833E−01 |
| $A_6$ | 6.08587E−01 | −1.88325E+00 | −3.63102E+00 | −4.85499E−01 | −1.83688E+00 |
| $A_8$ | −3.58169E+00 | 6.80828E+00 | 7.98322E+00 | −3.55244E+00 | 6.90662E+00 |
| $A_{10}$ | 2.13277E+01 | −3.33110E+01 | −4.87248E+01 | — | 3.12085E+01 |
| $A_{12}$ | −5.17616E+01 | −9.02764E+00 | 2.72099E+01 | — | −9.20575E+01 |

| | Surface# | | | | |
|---|---|---|---|---|---|
| | 7 | 8 | 9 | 10 | 11 |
| K | −1.33772E+00 | −1.00000E+00 | −7.86169E−01 | −3.35650E+00 | −4.82533E+00 |
| $A_4$ | −7.16849E−01 | 8.34757E−01 | 3.68373E−01 | −3.00798E+00 | −1.49140E+00 |
| $A_6$ | −2.39573E+00 | −2.90918E+00 | 8.40869E−01 | 8.93641E+00 | 4.19979E+00 |
| $A_8$ | 2.13049E+00 | 4.30405E+01 | 1.60707E+01 | −1.83906E+01 | −8.92329E+00 |
| $A_{10}$ | 1.61494E+01 | −4.00617E+02 | −4.56022E+01 | 2.70416E+01 | 1.27658E+01 |
| $A_{12}$ | 1.48959E+01 | 1.72512E+03 | −2.75872E+01 | −2.66134E+01 | −1.18498E+01 |
| $A_{14}$ | — | −3.64951E+03 | 1.80734E+02 | 1.64609E+01 | 6.38800E+00 |
| $A_{16}$ | — | 3.05167E+03 | −1.42217E+02 | −5.41085E+00 | −1.52280E+00 |

The content of Table 3-3 may be deduced from Table 3-1.

TABLE 3-3

| Embodiment 3 | | | |
|---|---|---|---|
| f (mm) | 2.03 | $R_5/R_6$ | 0.97 |
| f-number | 2.30 | $R_{10}/f$ | 0.28 |
| HFOV (deg.) | 32.0 | $|f/f_3|$ | 0.12 |
| $V_1 - V_2$ | 34.5 | $f_4/f$ | 0.89 |
| $CT_2 + CT_3$ (mm) | 0.40 | $f_5/f$ | −1.15 |
| $T_{34}/T_{45}$ | 0.35 | SD/TD | 0.94 |
| $(R_1 + R_2)/(R_1 - R_2)$ | −1.77 | | |

FIG. 3B is a graph of longitudinal spherical aberration curves when the lights having wavelengths of 486.1 nm (L), 587.6 nm (M), and 656.3 nm (N) are projected in the photographing optical lens assembly 30 in FIG. 3A.

FIG. 3C is a graph of astigmatic field curves with light entry of 587.6 nm reference wavelength in FIG. 3A.

FIG. 3D is a graph of a distortion curve with light entry of 587.6 nm reference wavelength in FIG. 3A.

The Fourth Embodiment (Embodiment 4)

Figure 4A:
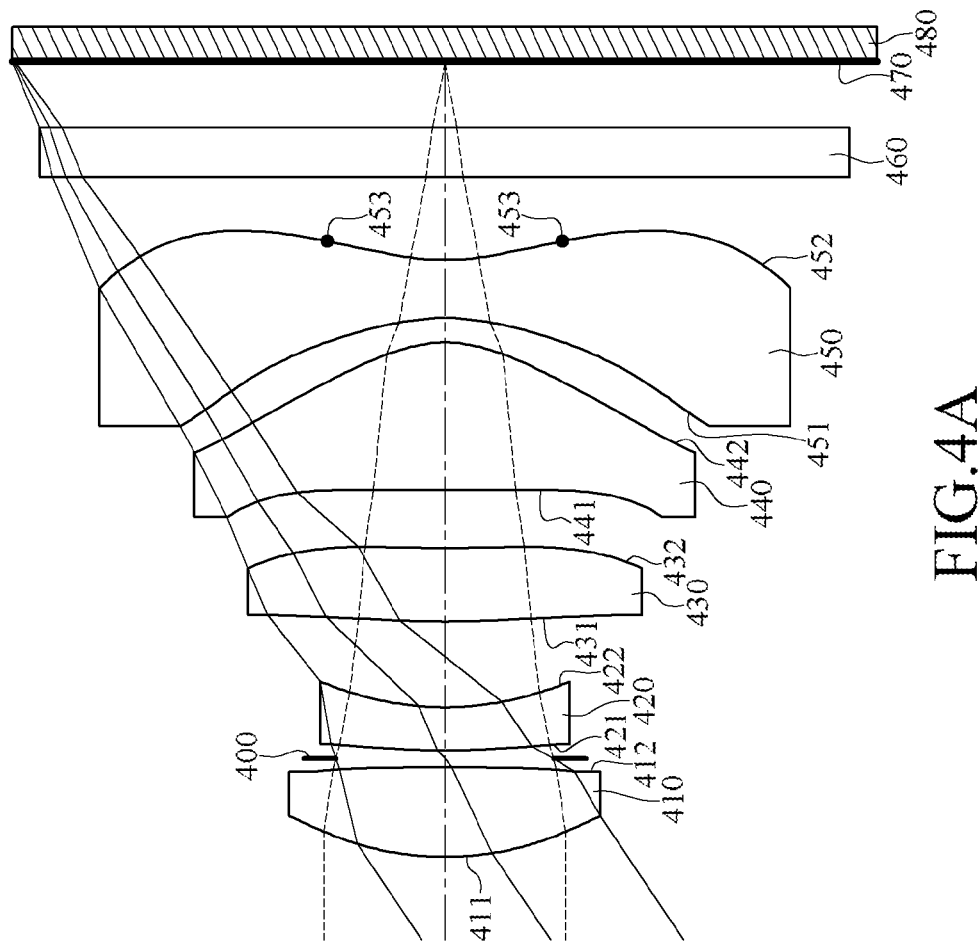
FIG. 4A is a schematic structural view of a fourth embodiment of a photographing optical lens assembly.

FIG. 4A is a schematic structural view of the fourth embodiment of the photographing optical lens assembly. The specific implementation and elements of the fourth embodiment are substantially the same as those in the first embodiment. The element symbols in the fourth embodiment all begin with "4" which correspond to those in the first embodiment with the same function or structure. For conciseness, only the differences are illustrated below, and the similarities will not be repeated herein.

In this embodiment, for example, the reference wavelength of the light received by the photographing optical lens assembly 40 is 587.6 nm, but the reference wavelength may be adjusted according to actual requirements, and is not limited to the wavelength value mentioned above.

In this embodiment, a first lens element 410 with positive refractive power comprises a convex object-side surface 411. A second lens element 420 has negative refractive power. A third lens element 430 with positive refractive power comprises a convex object-side surface 431 and a concave image-side surface 432. A fourth lens element 440 with positive refractive power comprises a convex object-side surface 441 and a concave image-side surface 442. A fifth lens element 450 with negative refractive power comprises a concave image-side surface 452 and at least one inflection point 453. In addition, a stop 400, such as an aperture stop, is disposed between the first lens element 410 and the second lens element 420.

The detailed data of the photographing optical lens assembly 40 is as shown in Table 4-1 below.

TABLE 4-1

Embodiment 4
f = 3.86, Fno = 2.65, HFOV = 34.0 deg.

| Surface # | | Curvature radius (mm) | Thickness (mm) | Material | Index | Abbe # | Focal length (mm) |
|---|---|---|---|---|---|---|---|
| 0 | Object | Plano | Infinity | | | | |
| 1 | Lens 1 | 1.785650 (ASP) | 0.542 | Plastic | 1.544 | 55.9 | 3.01 |
| 2 | | −17.539500 (ASP) | 0.050 | | | | |
| 3 | Ape. Stop | Plano | 0.050 | | | | |
| 4 | Lens 2 | 4.155400 (ASP) | 0.260 | Plastic | 1.634 | 23.8 | −4.50 |
| 5 | | 1.650530 (ASP) | 0.517 | | | | |
| 6 | Lens 3 | 5.835900 (ASP) | 0.445 | Plastic | 1.544 | 55.9 | 25.54 |
| 7 | | 9.791000 (ASP) | 0.349 | | | | |
| 8 | Lens 4 | 18.656700 (ASP) | 0.892 | Plastic | 1.544 | 55.9 | 1.34 |
| 9 | | −0.743630 (ASP) | 0.147 | | | | |
| 10 | Lens 5 | −1.288010 (ASP) | 0.350 | Plastic | 1.544 | 55.9 | −1.12 |
| 11 | | 1.269660 (ASP) | 0.500 | | | | |
| 12 | IR-cut filter | Plano | 0.300 | Glass | 1.517 | 64.2 | — |
| 13 | | Plano | 0.397 | | | | |
| 14 | Image sensor | Plano | — | | | | |

Note:
Reference wavelength is d-line 587.6 nm, and ASP represents aspheric.

In Table 4-1, from the object-side surface 411 to the image-side surface 452, all surfaces can be aspheric, and the aspheric surfaces can satisfy Condition ASP, but are not limited thereto. As for the parameters of the aspheric surfaces, reference is made to Table 4-2 below.

TABLE 4-2

| Aspheric Coefficients | | | | | |
|---|---|---|---|---|---|
| | Surface# | | | | |
| | 2 | 3 | 4 | 5 | 6 |
| K | 5.74762E−01 | −1.00000E+00 | 1.30581E+01 | 1.91409E+00 | −1.00000E+00 |
| $A_4$ | −1.59596E−02 | −3.60976E−02 | −1.87301E−01 | −2.03779E−01 | −7.79536E−02 |
| $A_6$ | −1.60641E−02 | 1.02303E−01 | 3.07846E−01 | 2.02978E−01 | 1.44658E−02 |
| $A_8$ | 2.98356E−02 | −9.23384E−02 | −3.74511E−01 | −2.37672E−01 | 4.44119E−02 |

TABLE 4-2-continued

| Aspheric Coefficients | | | | | |
|---|---|---|---|---|---|
| $A_{10}$ | −7.66850E−02 | −1.47866E−01 | −3.40432E−02 | 1.17987E−02 | −4.47316E−02 |
| $A_{12}$ | 7.16946E−02 | 1.46711E−01 | 2.44924E−01 | −1.05135E−01 | 2.09223E−02 |
| $A_{14}$ | −5.17354E−02 | −1.56644E−05 | −2.45198E−02 | 1.38836E−01 | −5.09608E−03 |

| | Surface# | | | | |
|---|---|---|---|---|---|
| | 7 | 8 | 9 | 10 | 11 |
| K | −1.00000E+00 | −1.00000E+00 | −4.05067E+00 | −1.14723E+01 | −1.27311E+01 |
| $A_4$ | −1.12283E−01 | −6.15768E−02 | −4.07015E−02 | −6.19950E−02 | −4.59851E−02 |
| $A_6$ | 1.18046E−02 | 2.02761E−02 | 3.60197E−02 | 1.63192E−03 | 6.52228E−03 |
| $A_8$ | −1.33829E−02 | −1.89686E−02 | −1.25385E−02 | 1.96019E−03 | −1.44786E−03 |
| $A_{10}$ | 1.08039E−02 | 6.48833E−04 | 7.07653E−04 | −5.09239E−06 | 5.56713E−05 |
| $A_{12}$ | 4.25150E−04 | 1.04020E−03 | 5.41354E−04 | 6.50319E−05 | 1.69628E−05 |
| $A_{14}$ | −1.35218E−03 | 1.99803E−05 | −2.46560E−05 | 8.26006E−06 | −1.03498E−06 |

The content of Table 4-3 may be deduced from Table 4-1.

TABLE 4-3

| Embodiment 4 | | | |
|---|---|---|---|
| f (mm) | 3.86 | $R_5/R_6$ | 0.60 |
| f-number | 2.65 | $R_{10}/f$ | 0.33 |
| HFOV (deg.) | 34.0 | $|f/f_3|$ | 0.15 |
| $V_1 - V_2$ | 32.1 | $f_4/f$ | 0.35 |
| $CT_2 + CT_3$ (mm) | 0.71 | $f_5/f$ | −0.29 |
| $T_{34}/T_{45}$ | 2.37 | SD/TD | 0.84 |
| $(R_1 + R_2)/(R_1 - R_2)$ | −0.82 | | |

FIG. 4B is a graph of longitudinal spherical aberration curves when the lights having wavelengths of 486.1 nm (L), 587.6 nm (M), and 656.3 nm (N) are projected in the photographing optical lens assembly 40 in FIG. 4A.

FIG. 4C is a graph of astigmatic field curves with light entry of 587.6 nm reference wavelength in FIG. 4A.

FIG. 4D is a graph of a distortion curve with light entry of 587.6 nm reference wavelength in FIG. 4A.

The Fifth Embodiment (Embodiment 5)

Figure 5A:
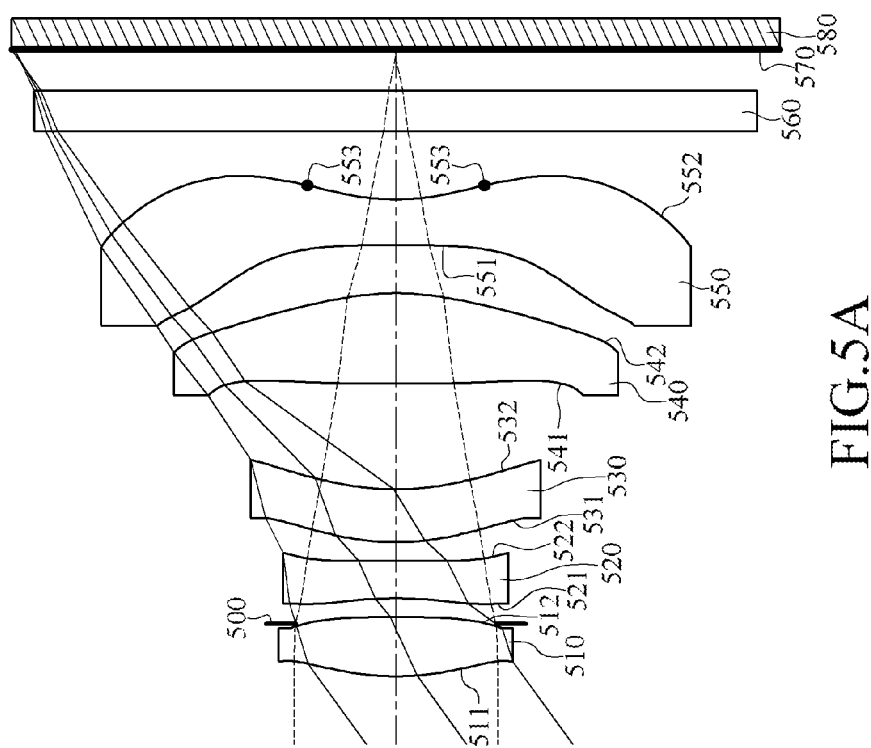
FIG. 5A is a schematic structural view of a fifth embodiment of a photographing optical lens assembly.

FIG. 5A is a schematic structural view of the fifth embodiment of the photographing optical lens assembly. The specific implementation and elements of the fifth embodiment are substantially the same as those in the first embodiment. The element symbols in the fifth embodiment all begin with "5" which correspond to those in the first embodiment with the same function or structure. For conciseness, only the differences are illustrated below, and the similarities will not be repeated herein.

In this embodiment, for example, the reference wavelength of the light received by the photographing optical lens assembly 50 is 587.6 nm, but the reference wavelength may be adjusted according to actual requirements, and is not limited to the wavelength value mentioned above.

In this embodiment, a first lens element 510 with positive refractive power comprises a convex object-side surface 511. A second lens element 520 has negative refractive power. A third lens element 530 with positive refractive power comprises a convex object-side surface 531 and a concave image-side surface 532. A fourth lens element 540 with positive refractive power comprises a convex object-side surface 541 and a convex image-side surface 542. A fifth lens element 550 with negative refractive power comprises a concave image-side surface 552 and an inflection point 553. In addition, a stop 500, such as an aperture stop, is disposed between the first lens element 510 and the second lens element 520.

The detailed data of the photographing optical lens assembly 50 is as shown in Table 5-1 below.

TABLE 5-1

Embodiment 5
f = 3.88, Fno = 2.60, HFOV = 35.8 deg.

| Surface # | | Curvature radius (mm) | Thickness (mm) | Material | Index | Abbe # | Focal length (mm) |
|---|---|---|---|---|---|---|---|
| 0 | Object | Plano | Infinity | | | | |
| 1 | Lens 1 | 1.854490 (ASP) | 0.434 | Plastic | 1.544 | 55.9 | 3.12 |
| 2 | | −18.325700 (ASP) | −0.046 | | | | |
| 3 | Ape. Stop | Plano | 0.185 | | | | |
| 4 | Lens 2 | −2.627140 (ASP) | 0.275 | Plastic | 1.634 | 23.8 | −5.57 |
| 5 | | −10.683800 (ASP) | 0.137 | | | | |
| 6 | Lens 3 | 1.719590 (ASP) | 0.388 | Plastic | 1.544 | 55.9 | 19.71 |
| 7 | | 1.885180 (ASP) | 0.775 | | | | |
| 8 | Lens 4 | 18.726600 (ASP) | 0.665 | Plastic | 1.544 | 55.9 | 3.34 |
| 9 | | −1.985020 (ASP) | 0.353 | | | | |
| 10 | Lens 5 | −23.255400 (ASP) | 0.335 | Plastic | 1.530 | 55.8 | −2.62 |
| 11 | | 1.485340 (ASP) | 0.500 | | | | |
| 12 | IR-cut filter | Plano | 0.300 | Glass | 1.517 | 64.2 | — |
| 13 | | Plano | 0.301 | | | | |
| 14 | Image sensor | Plano | — | | | | |

Note:
Reference wavelength is d-line 587.6 nm, and ASP represents aspheric.

In Table 5-1, from the object-side surface 511 to image-side surface 552, all the surfaces can be aspheric, and the aspheric surfaces can satisfy Condition ASP, but are not limited thereto. As for the parameters of the aspheric surfaces, reference is made to Table 5-2 below.

TABLE 5-2

Aspheric Coefficients

| | Surface# | | | | |
|---|---|---|---|---|---|
| | 1 | 2 | 4 | 5 | 6 |
| K | −2.04133E+00 | 2.52259E−01 | −1.47225E+01 | −2.45788E+01 | 1.20193E+00 |
| $A_4$ | −3.72709E−02 | −1.62365E−01 | 1.25808E−01 | 2.19168E−01 | −1.97406E−01 |
| $A_6$ | −5.70890E−02 | −7.00355E−02 | −4.05603E−02 | 1.90717E−02 | 1.40958E−01 |
| $A_8$ | −2.01721E−01 | 2.03786E−01 | 2.55327E−01 | −3.26648E−02 | −2.16976E−01 |
| $A_{10}$ | 1.45100E−01 | −2.25830E−01 | −2.44271E−01 | −1.39930E−01 | 1.47844E−01 |
| $A_{12}$ | −6.47158E−02 | 6.09088E−02 | 7.67983E−02 | 1.18929E−01 | −8.08689E−02 |

| | Surface# | | | | |
|---|---|---|---|---|---|
| | 7 | 8 | 9 | 10 | 11 |
| K | −3.37885E−01 | −1.00000E+00 | −7.51156E+00 | 5.82839E+01 | −4.55709E+00 |
| $A_4$ | −1.03159E−01 | 5.66890E−04 | 3.11540E−02 | −1.01482E−01 | −1.21442E−01 |
| $A_6$ | 3.99708E−02 | 3.24355E−02 | −1.64369E−02 | −4.08179E−02 | 3.93112E−02 |
| $A_8$ | 1.63057E−02 | −6.77651E−02 | −6.12682E−03 | 3.02361E−02 | −1.18864E−02 |
| $A_{10}$ | −5.11385E−02 | 3.99654E−02 | 4.00683E−03 | −2.33927E−01 | 2.58909E−03 |
| $A_{12}$ | 2.06055E−02 | −8.69691E−03 | 1.13484E−03 | −3.06772E−04 | −3.25976E−04 |
| $A_{14}$ | — | −6.58077E−04 | −6.09007E−04 | −6.69366E−05 | 1.61496E−05 |

The content of Table 5-3 may be deduced from Table 5-1.

TABLE 5-3

Embodiment 5

| f (mm) | 3.88 | $R_5/R_6$ | 0.91 |
|---|---|---|---|
| f-number | 2.60 | $R_{10}/f$ | 0.38 |
| HFOV (deg.) | 35.8 | $|f/f_3|$ | 0.20 |
| $V_1 − V_2$ | 32.1 | $f_4/f$ | 0.86 |
| $CT_2 + CT_3$ (mm) | 0.66 | $f_5/f$ | −0.68 |
| $T_{34}/T_{45}$ | 2.20 | SD/TD | 0.89 |
| $(R_1 + R_2)/(R_1 − R_2)$ | −0.82 | | |

FIG. 5B is a graph of longitudinal spherical aberration curves when the lights having wavelengths of 486.1 nm (L), 587.6 nm (M), and 656.3 nm (N) are projected in the photographing optical lens assembly 50 in FIG. 5A.

FIG. 5C is a graph of astigmatic field curves with light entry of 587.6 nm reference wavelength in FIG. 5A.

FIG. 5D is a graph of a distortion curve with light entry of 587.6 nm reference wavelength in FIG. 5A.

The Sixth Embodiment (Embodiment 6)

Figure 6A:
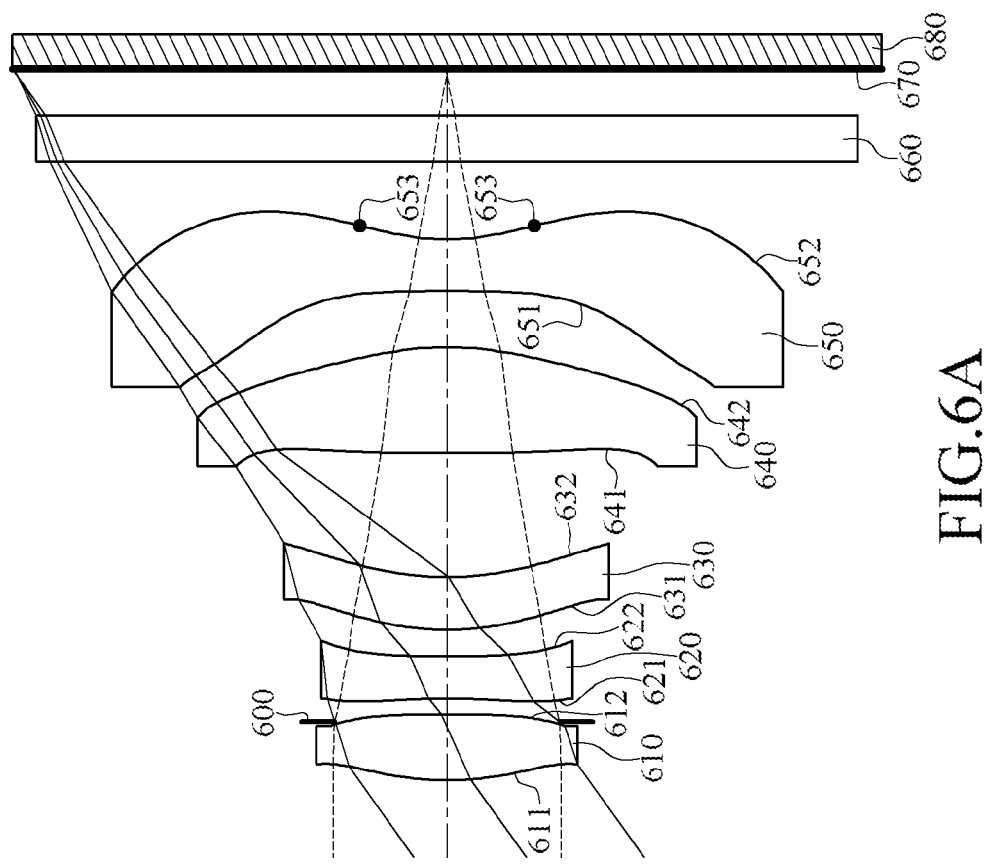
FIG. 6A is a schematic structural view of a sixth embodiment of a photographing optical lens assembly.

FIG. 6A is a schematic structural view of the sixth embodiment of the photographing optical lens assembly. The specific implementation and elements of the sixth embodiment are substantially the same as those in the first embodiment. The element symbols in the sixth embodiment all begin with "6" which correspond to those in the first embodiment with the same function or structure. For conciseness, only the differences are illustrated below, and the similarities will not be repeated herein.

In this embodiment, for example, the reference wavelength of the light received by the photographing optical lens assembly 60 is 587.6 nm, but the reference wavelength may be adjusted according to actual requirements, and is not limited to the wavelength value mentioned above.

In this embodiment, a first lens element 610 with positive refractive power comprises a convex object-side surface 611. A second lens element 620 has negative refractive power. A third lens element 630 with positive refractive power comprises a convex object-side surface 631 and a concave image-side surface 632. A fourth lens element 640 with positive refractive power comprises a convex object-side surface 641 and a convex image-side surface 642. A fifth lens element 650 with negative refractive power comprises a concave image-side surface 652 and at least one inflection point 653. In addition, a stop 600, such as an aperture stop, is disposed between the first lens element 610 and the second lens element 620.

The detailed data of the photographing optical lens assembly 60 is as shown in Table 6-1 below.

TABLE 6-1

Embodiment 6
f = 3.90, Fno = 2 65, HFOV = 35.6 deg.

| Surface # | | Curvature radius (mm) | Thickness (mm) | Material | Index | Abbe # | Focal length (mm) |
|---|---|---|---|---|---|---|---|
| 0 | Object | Plano | Infinity | | | | |
| 1 | Lens 1 | 1.860080 (ASP) | 0.426 | Plastic | 1.544 | 55.9 | 3.14 |
| 2 | | −19.049300 (ASP) | −0.045 | | | | |
| 3 | Ape. Stop | Plano | 0.146 | | | | |
| 4 | Lens 2 | −4.506800 (ASP) | 0.275 | Plastic | 1.634 | 23.8 | −5.52 |
| 5 | | 16.094000 (ASP) | 0.171 | | | | |
| 6 | Lens 3 | 1.691870 (ASP) | 0.341 | Plastic | 1.544 | 55.9 | 19.73 |
| 7 | | 1.865730 (ASP) | 0.800 | | | | |

TABLE 6-1-continued

Embodiment 6
f = 3.90, Fno = 2.65, HFOV = 35.6 deg.

| Surface # | | Curvature radius (mm) | Thickness (mm) | Material | Index | Abbe # | Focal length (mm) |
|---|---|---|---|---|---|---|---|
| 8 | Lens 4 | 18.726600 (ASP) | 0.688 | Plastic | 1.544 | 55.9 | 3.24 |
| 9 | | −1.921550 (ASP) | 0.362 | | | | |
| 10 | Lens 5 | −23.661400 (ASP) | 0.335 | Plastic | 1.530 | 55.8 | −2.49 |
| 11 | | 1.402420 (ASP) | 0.500 | | | | |
| 12 | IR-cut filter | Plano | 0.300 | Glass | 1.517 | 64.2 | — |
| 13 | | Plano | 0.302 | | | | |
| 14 | Image sensor | Plano | — | | | | |

Note:
Reference wavelength is d-line 587.6 nm, and ASP represents aspheric.

In Table 6-1, from the object-side surface 611 to the image-side surface 652, all surfaces can be aspheric, and the aspheric surfaces can satisfy Condition ASP, but are not limited thereto. As for the parameters of the aspheric surfaces, reference is made to Table 6-2 below.

TABLE 6-2

Aspheric Coefficients

| | Surface# | | | | |
|---|---|---|---|---|---|
| | 1 | 2 | 4 | 5 | 6 |
| K | −2.30463E+00 | 3.00000E+00 | −1.50000E+01 | −3.00000E+01 | 1.21469E+00 |
| $A_4$ | −4.16964E−02 | −1.67261E−01 | 1.45171E−01 | 2.00012E−01 | −1.88373E−01 |
| $A_6$ | −6.09701E−02 | −8.07391E−02 | −5.71400E−02 | 2.83698E−02 | 1.39612E−01 |
| $A_8$ | −2.22212E−01 | 2.44383E−01 | 2.78425E−01 | −4.63772E−02 | −2.18E−01 |
| $A_{10}$ | 1.65939E−01 | −2.64296E−01 | −2.59280E−01 | −1.13379E−01 | 1.47067E−01 |
| $A_{12}$ | −6.47159E−02 | 6.09087E−02 | 7.67982E−02 | 1.18929E−01 | −7.89E−02 |

| | Surface# | | | | |
|---|---|---|---|---|---|
| | 7 | 8 | 9 | 10 | 11 |
| K | −2.90676E−01 | −1.00000E+00 | −8.13811E+00 | 3.00000E+00 | −4.93000E+00 |
| $A_4$ | −1.01408E−01 | 9.96107E−03 | 3.34239E−02 | −1.07338E−01 | −1.18277E−01 |
| $A_6$ | 4.16724E−02 | 2.72461E−02 | −1.71800E−02 | −3.97228E−02 | 3.86194E−02 |
| $A_8$ | 1.44133E−02 | −6.96597E−02 | −6.94322E−03 | 3.04263E−02 | −1.18403E−02 |
| $A_{10}$ | −5.23085E−02 | 4.10456E−02 | 3.79855E−03 | −2.44233E−03 | 2.58776E−03 |
| $A_{12}$ | 2.00693E−02 | −8.36878E−03 | 1.13366E−03 | −3.53713E−04 | −3.23202E−04 |
| $A_{14}$ | — | −9.75767E−04 | −5.91167E−04 | −6.19435E−05 | 1.57663E−05 |

The content of Table 6-3 may be deduced from Table 6-1.

TABLE 6-3

Embodiment 6

| f (mm) | 3.90 | $R_5/R_6$ | 0.91 |
|---|---|---|---|
| f-number | 2.65 | $R_{10}/f$ | 0.36 |
| HFOV (deg.) | 35.6 | $|f/f_3|$ | 0.20 |
| $V_1 - V_2$ | 32.1 | $f_4/f$ | 0.83 |
| $CT_2 + CT_3$ (mm) | 0.62 | $f_5/f$ | −0.64 |
| $T_{34}/T_{45}$ | 2.21 | SD/TD | 0.89 |
| $(R_1 + R_2)/(R_1 - R_2)$ | −0.82 | | |

FIG. 6B is a graph of longitudinal spherical aberration curves when the lights having wavelengths of 486.1 nm (L), 587.6 nm (M), and 656.3 nm (N) are projected in the photographing optical lens assembly 60 in FIG. 6A.

FIG. 6C is a graph of astigmatic field curves with light entry of 587.6 nm reference wavelength in FIG. 6A.

FIG. 6D is a graph of a distortion curve with light entry of 587.6 nm reference wavelength in FIG. 5A.

The Seventh Embodiment (Embodiment 7)

Figure 7A:
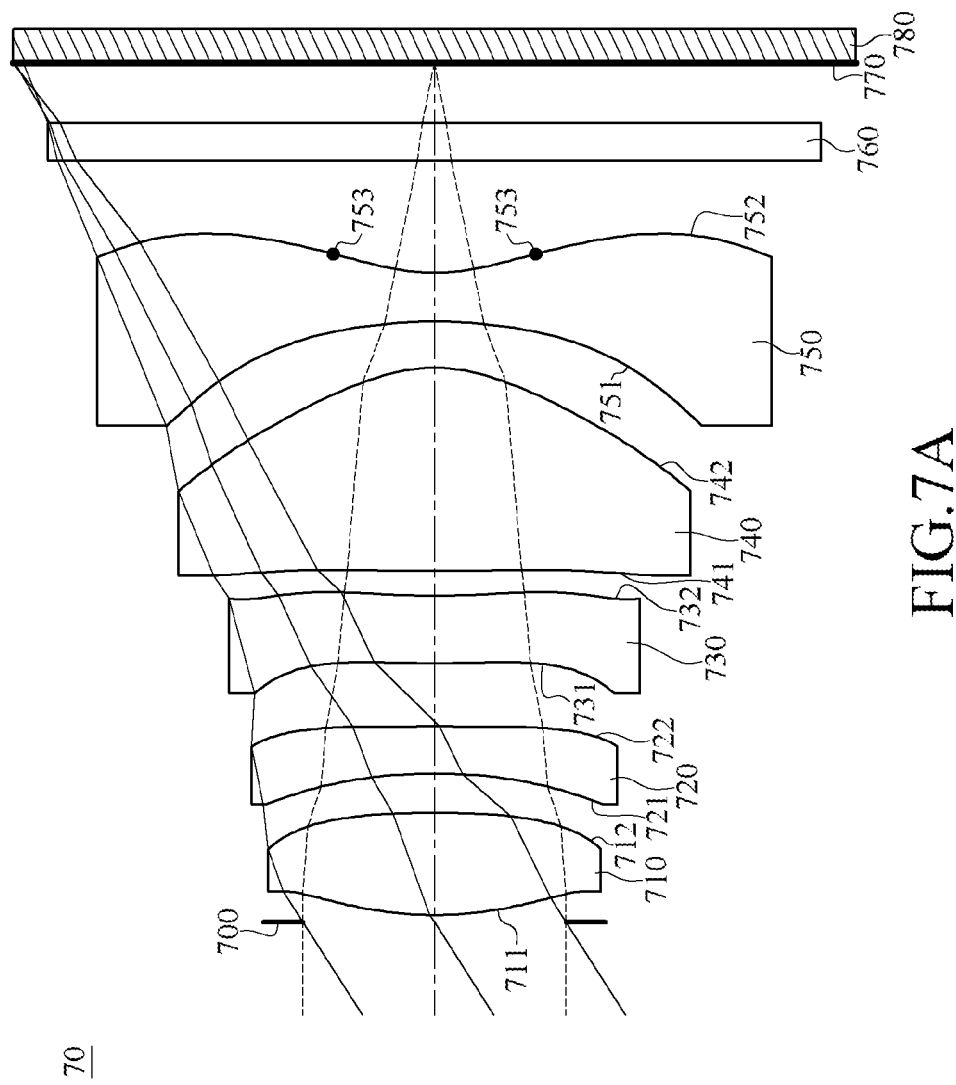
FIG. 7A is a schematic structural view of a seventh embodiment of a photographing optical lens assembly.

FIG. 7A is a schematic structural view of the seventh embodiment of the photographing optical lens assembly. The specific implementation and elements of the seventh embodiment are substantially the same as those in the first embodiment. The element symbols in the seventh embodiment all begin with "7" which correspond to those in the first embodiment with the same function or structure. For conciseness, only the differences are illustrated below, and the similarities will not be repeated herein.

In this embodiment, for example, the reference wavelength of the light received by the photographing optical lens assembly 70 is 587.6 nm, but the reference wavelength may be adjusted according to actual requirements, and is not limited to the wavelength value mentioned above.

In this embodiment, a first lens element 710 with positive refractive power comprises a convex object-side surface 711. A second lens element 720 has negative refractive power. A third lens element 730 with negative refractive power comprises a convex object-side surface 731 and a concave image-side surface 732. A fourth lens element 740 with positive refractive power comprises a convex object-side surface 741 and a convex image-side surface 742. A fifth lens element 750 with negative refractive power comprises a concave image-side surface 752 and at least one inflection point 753.

The detailed data of the photographing optical lens assembly 70 is as shown in Table 7-1 below.

TABLE 7-1

Embodiment 7
f = 3.58, Fno = 2.55, HFOV = 32.4 deg.

| Surface # | | Curvature radius (mm) | Thickness (mm) | Material | Index | Abbe # | Focal length (mm) |
|---|---|---|---|---|---|---|---|
| 0 | Object | Plano | Infinity | | | | |
| 1 | Ape. Stop | Plano | 0.037 | | | | |
| 2 | Lens 1 | 1.913260 (ASP) | 0.546 | Plastic | 1.544 | 55.9 | 2.64 |
| 3 | | −5.175600 (ASP) | 0.209 | | | | |
| 4 | Lens 2 | −2.914310 (ASP) | 0.252 | Plastic | 1.634 | 23.8 | −4.74 |
| 5 | | −100.000000 (ASP) | 0.338 | | | | |
| 6 | Lens 3 | 7.681700 (ASP) | 0.361 | Plastic | 1.634 | 23.8 | −17.10 |
| 7 | | 4.413700 (ASP) | 0.132 | | | | |
| 8 | Lens 4 | 15.743100 (ASP) | 1.086 | Plastic | 1.544 | 55.9 | 1.51 |
| 9 | | −0.846500 (ASP) | 0.246 | | | | |
| 10 | Lens 5 | −2.838830 (ASP) | 0.262 | Plastic | 1.535 | 56.3 | −1.32 |
| 11 | | 0.971180 (ASP) | 0.600 | | | | |
| 12 | IR-cut filter | Plano | 0.200 | Glass | 1.517 | 64.2 | — |
| 13 | | Plano | 0.321 | | | | |
| 14 | Image sensor | Plano | — | | | | |

Note:
Reference wavelength is d-line 587.6 nm, and ASP represents aspheric.

In Table 7-1, from the object-side surface 711 to the image-side surface 752, all surfaces can be aspheric, and the aspheric surfaces can satisfy Condition ASP, but are not limited thereto. As for the parameters of the aspheric surfaces, reference is made to Table 7-2 below.

TABLE 7-2

Aspheric Coefficients

| | Surface# | | | | |
|---|---|---|---|---|---|
| | 1 | 2 | 4 | 5 | 6 |
| K | −1.02455E+01 | 2.51255E+00 | −9.70270E+00 | −1.00000E+00 | −1.82765E+01 |
| $A_4$ | 1.47032E−01 | −8.43028E−02 | −6.26196E−02 | −4.85531E−02 | −1.92016E−01 |
| $A_6$ | −2.70147E−01 | −9.77657E−02 | −1.18815E−01 | −7.09451E−02 | −1.53927E−01 |
| $A_8$ | 2.54252E−01 | −3.62352E−02 | 3.32429E−01 | 1.68191E−01 | 2.97185E−01 |
| $A_{10}$ | −3.24189E−01 | 6.47415E−02 | −6.48004E−01 | −4.09042E−01 | −3.84262E−01 |
| $A_{12}$ | 3.40938E−02 | −8.40824E−02 | 8.26486E−01 | 3.91073E−01 | 1.69218E−01 |
| $A_{14}$ | −2.44535E−02 | 1.76471E−03 | −3.89736E−01 | −1.46479E−01 | 9.60379E−03 |

| | Surface# | | | | |
|---|---|---|---|---|---|
| | 7 | 8 | 9 | 10 | 11 |
| K | −1.00000E+00 | −1.00000E+00 | −4.27460E+00 | 2.16347E+00 | −8.13183E+00 |
| $A_4$ | −1.57934E−01 | −5.12492E−02 | −9.45923E−02 | 5.10646E−03 | −9.28690E−02 |
| $A_6$ | −7.65715E−02 | 5.40218E−02 | 1.33909E−01 | −5.61698E−02 | 3.45144E−02 |
| $A_8$ | 1.30562E−01 | −2.13394E−01 | −1.28855E−01 | 3.65082E−02 | −1.09540E−02 |
| $A_{10}$ | −6.31639E−02 | 3.02198E−01 | 6.63183E−02 | −7.51463E−03 | 2.10844E−03 |
| $A_{12}$ | 4.67994E−02 | −1.72276E−01 | −1.68245E−02 | −1.65306E−03 | −2.42848E−04 |
| $A_{14}$ | −1.25125E−02 | 3.55565E−02 | 1.40796E−03 | 1.01269E−03 | 1.81794E−05 |

The content of Table 7-3 may be deduced from Table 7-1.

TABLE 7-3

Embodiment 7

| f (mm) | 3.58 | $R_5/R_6$ | 1.74 |
|---|---|---|---|
| f-number | 2.55 | $R_{10}/f$ | 0.27 |
| HFOV (deg.) | 32.4 | $|f/f_3|$ | 0.20 |
| $V_1 − V_2$ | 32.1 | $f_4/f$ | 0.44 |
| $CT_2 + CT_3$ (mm) | 0.61 | $f_5/f$ | −0.39 |
| $T_{34}/T_{45}$ | 0.54 | SD/TD | 1.01 |
| $(R_1 + R_2)/(R_1 − R_2)$ | −0.46 | | |

FIG. 7B is a graph of longitudinal spherical aberration curves when the lights having wavelengths of 486.1 nm (L), 587.6 nm (M), and 656.3 nm (N) are projected in the photographing optical lens assembly 70 in FIG. 7A.

FIG. 7C is a graph of astigmatic field curves with light entry of 587.6 nm reference wavelength in FIG. 6A.

FIG. 7D is a graph of a distortion curve with light entry of 587.6 nm reference wavelength in FIG. 7A.

The Eighth Embodiment (Embodiment 8)

Figure 8A:
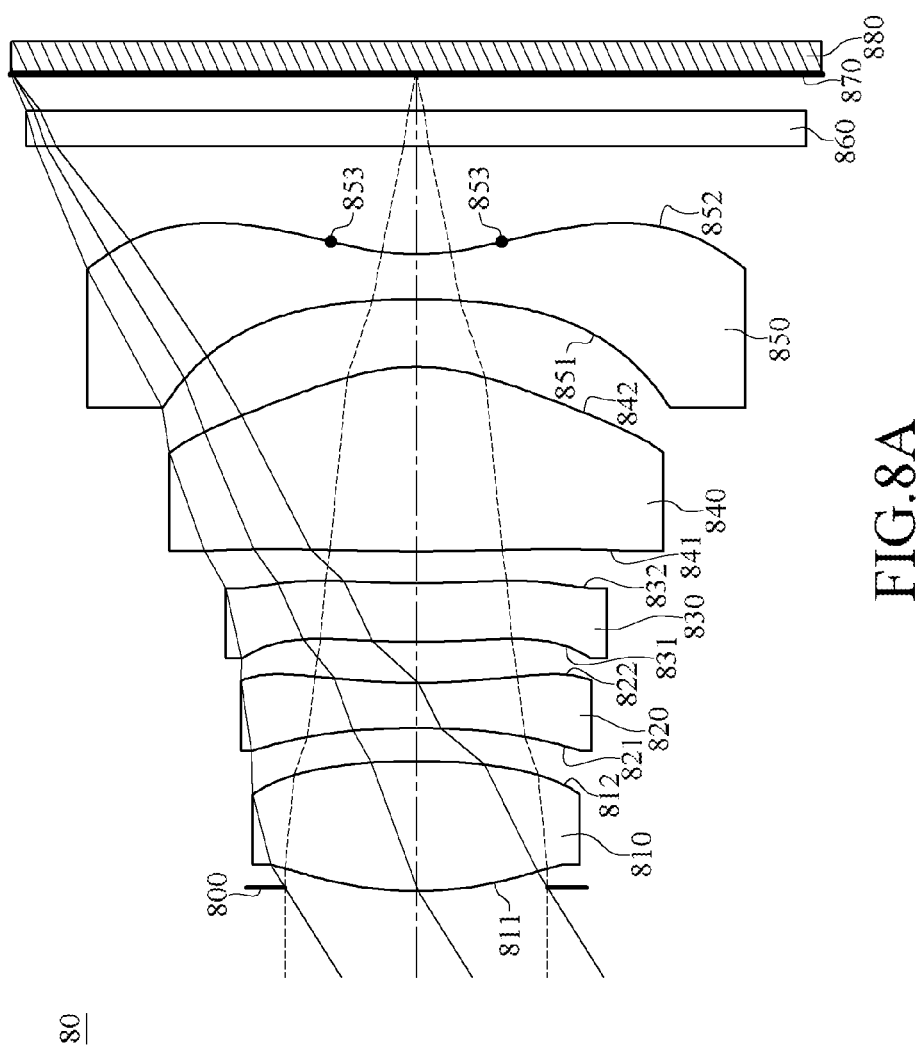
FIG. 8A is a schematic structural view of an eighth embodiment of a photographing optical lens assembly.

FIG. 8A is a schematic structural view of the eighth embodiment of the photographing optical lens assembly. The specific implementation and elements of the eighth embodiment are substantially the same as those in the first embodiment. The element symbols in the eighth embodiment all begin with "8" which correspond to those in the first embodiment with the same function or structure. For conciseness, only the differences are illustrated below, and the similarities will not be repeated herein.

In this embodiment, for example, the reference wavelength of the light received by the photographing optical lens assembly 80 is 587.6 nm, but the reference wavelength may be adjusted according to actual requirements, and is not limited to the wavelength value mentioned above.

In this embodiment, a first lens element 810 with positive refractive power comprises a convex object-side surface 811. A second lens element 820 has negative refractive power. A third lens element 830 with positive refractive power comprises a convex object-side surface 831 and a concave image-side surface 832. A fourth lens element 840 with positive refractive power comprises a convex object-side surface 841 and a convex image-side surface 842. A fifth lens element 850 with negative refractive power comprises a concave image-side surface 852 and at least one inflection point 853.

The detailed data of the photographing optical lens assembly 80 is as shown in Table 8-1 below.

TABLE 8-1

Embodiment 8
f = 3.57, Fno = 2.45, HFOV = 32.0 deg.

| Surface # | | Curvature radius (mm) | Thickness (mm) | Material | Index | Abbe # | Focal length (mm) |
|---|---|---|---|---|---|---|---|
| 0 | Object | Plano | Infinity | | | | |
| 1 | Ape. Stop | Plano | −0.019 | | | | |
| 2 | Lens 1 | 1.943200 (ASP) | 0.722 | Plastic | 1.544 | 55.9 | 2.50 |
| 3 | | −3.949200 (ASP) | 0.184 | | | | |
| 4 | Lens 2 | −4.504200 (ASP) | 0.252 | Plastic | 1.634 | 23.8 | −3.11 |
| 5 | | 3.590900 (ASP) | 0.226 | | | | |
| 6 | Lens 3 | 4.084200 (ASP) | 0.327 | Plastic | 1.634 | 23.8 | 25.13 |
| 7 | | 5.321100 (ASP) | 0.178 | | | | |
| 8 | Lens 4 | 15.743100 (ASP) | 1.025 | Plastic | 1.544 | 55.9 | 2.04 |
| 9 | | −1.168060 (ASP) | 0.376 | | | | |
| 10 | Lens 5 | −4.139200 (ASP) | 0.250 | Plastic | 1.544 | 55.9 | −1.73 |
| 11 | | 1.246700 (ASP) | 0.600 | | | | |
| 12 | IR-cut filter | Plano | 0.200 | Glass | 1.517 | 64.2 | — |
| 13 | | Plano | 0.202 | | | | |
| 14 | Image sensor | Plano | — | | | | |

Note:
Reference wavelength is d-line 587.6 nm, and ASP represents aspheric.

In Table 8-1, from the object-side surface 811 to the image-side surface 852, all surfaces can be aspheric, and the aspheric surfaces can satisfy Condition ASP, but are not limited thereto. As for the parameters of the aspheric surfaces, reference is made to Table 8-2 below.

TABLE 8-2

Aspheric Coefficients

| | Surface# | | | | |
|---|---|---|---|---|---|
| | 2 | 3 | 4 | 5 | 6 |
| K | −1.13818E+01 | −1.21641E+01 | −1.57754E+01 | −1.26285E+01 | −1.08923E+01 |
| $A_4$ | 1.62988E−01 | −6.87140E−02 | −5.43625E−02 | −5.87522E−02 | −1.80284E−01 |
| $A_6$ | −2.38766E−01 | −8.33633E−02 | −1.26313E−01 | −4.13272E−02 | −1.10921E−01 |
| $A_8$ | 2.06743E−01 | −1.66245E−02 | 3.56195E−01 | 1.69070E−01 | 2.92292E−01 |
| $A_{10}$ | −1.83317E−01 | 9.19590E−02 | −6.81674E−01 | −4.41673E−01 | −3.95361E−01 |
| $A_{12}$ | 3.40938E−02 | −8.40824E−02 | 8.26486E−01 | 3.99915E−01 | 1.73856E−01 |
| $A_{14}$ | −2.44535E−02 | 1.76471E−03 | −3.89736E−01 | −1.45061E−01 | −1.15705E−03 |

| | Surface# | | | | |
|---|---|---|---|---|---|
| | 7 | 8 | 9 | 10 | 11 |
| K | −1.00000E+00 | −1.00000E+00 | −5.41695E+00 | 2.75868E+00 | −7.30254E+00 |
| $A_4$ | −1.56715E−01 | −1.80764E−02 | −5.10474E−02 | −5.89203E−02 | −1.05143E−01 |
| $A_6$ | −7.21079E−02 | 4.65272E−02 | 1.28789E−01 | −3.80438E−02 | 3.67693E−02 |
| $A_8$ | 1.28745E−01 | −2.16100E−01 | −1.30904E−01 | 3.42089E−02 | −1.12748E−02 |
| $A_{10}$ | −6.22381E−02 | 3.00532E−01 | 6.61271E−02 | −9.97886E−03 | 1.90107E−03 |
| $A_{12}$ | 4.78280E−02 | −1.72749E−01 | −1.66789E−02 | −2.47282E−03 | −2.65897E−04 |
| $A_{14}$ | −9.05141E−03 | 3.59827E−02 | 1.28276E−03 | 1.04258E−03 | 3.17118E−05 |

The content of Table 8-3 may be deduced from Table 8-1.

TABLE 8-3

| Embodiment 8 | | | |
|---|---|---|---|
| f (mm) | 3.57 | $R_5/R_6$ | 0.77 |
| f-number | 2.45 | $R_{10}/f$ | 0.35 |
| HFOV(deg.) | 32.0 | $|f/f_3|$ | 0.14 |
| $V_1 - V_2$ | 32.1 | $f_4/f$ | 0.57 |
| $CT_2 + CT_3$(mm) | 0.58 | $f_5/f$ | −0.49 |
| $T_{34}/T_{45}$ | 0.47 | SD/TD | 0.99 |
| $(R_1 + R_2)/(R_1 - R_2)$ | −0.34 | | |

FIG. 8B is a graph of longitudinal spherical aberration curves when the lights having wavelengths of 486.1 nm (L), 587.6 nm (M), and 656.3 nm (N) are projected in the photographing optical lens assembly 80 in FIG. 8A.

FIG. 8C is a graph of astigmatic field curves with light entry of 587.6 nm reference wavelength in FIG. 6A.

FIG. 8D is a graph of a distortion curve with light entry of 587.6 nm reference wavelength in FIG. 7A.

What is claimed is:

1. A photographing optical lens assembly comprising, in order from an object side to an image side:
   a first lens element with positive refractive power;
   a second lens element with negative refractive power;
   a third lens element with refractive power comprising a convex object-side surface and a concave image-side surface, and both the object-side surface and the image-side surface being aspheric;
   a fourth lens element with positive refractive power comprising a convex object-side surface and a convex image-side surface;
   a plastic fifth lens element comprising an aspheric object-side surface, an aspheric concave image-side surface and at least one inflection point;
   the photographing optical lens assembly satisfying the following condition:

$|f/f_3|<0.65$; and $0.1<T_{34}/T_{45}<2.7$;

wherein f is the focal length of the photographing lens assembly; $f_3$ is the focal length of the third lens element; $T_{34}$ is the axial distance between the third lens element and the fourth lens element; $T_{45}$ is the axial distance between the fourth lens element and the fifth lens element.

2. The photographing optical lens assembly according to claim 1, wherein there are air distances between any two of the first lens element, the second lens element, the third lens element, the fourth lens element and the fifth lens element.

3. The photographing optical lens assembly according to claim 2, wherein the photographing optical lens assembly satisfies the following condition:

$0.2<f_4/f<0.9$; and $-1.2<f_5/f<-0.2$;

wherein $f_4$ is the focal length of the fourth lens element; $f_5$ is the focal length of the fifth lens element.

4. The photographing optical lens assembly according to claim 2, wherein the photographing optical lens assembly satisfies the following condition:

$0.1<R_{10}/f<0.6$ wherein $R_{10}$ is the curvature radius of the image-side surface of fifth lens element.

5. The photographing optical lens assembly according to claim 2, further comprising a stop and an image plane, and the photographing optical lens assembly satisfying the following condition:

$0.7<SD/TD<1.1$; and $0.1<T_{34}/T_{45}<2.4$ wherein SD is the axial distance between the stop and the image-side surface of the fifth lens element; TD is the axial distance between the object-side surface of the first lens element and the image-side surface of the fifth lens element; $T_{34}$ is the axial distance between the third lens element and the fourth lens element; $T_{45}$ is the axial distance between the fourth lens element and the fifth lens element.

6. The photographing optical lens assembly according to claim 2, wherein the photographing optical lens assembly satisfies the following condition:

$0<R_5/R_6<3.2$;

wherein $R_5$ is the curvature radius of the object-side surface of the third lens element; $R_6$ is the curvature radius of the image-side surface of the third lens element.

7. The photographing optical lens assembly according to claim 6, wherein the photographing optical lens assembly satisfies the following condition:

$0<R_5/R_6<2.0$.

8. The photographing optical lens assembly according to claim 1, wherein the photographing optical lens assembly satisfies:

$|f/f_3|<0.35$.

9. The photographing optical lens assembly according to claim 1 wherein the photographing optical lens assembly satisfies:

$30<V_1-V_2<42$;

wherein $V_1$ is the Abbe number of the first lens element; $V_2$ is the Abbe number of the second lens element.

10. The photographing optical lens assembly according to claim 1, wherein the photographing optical lens assembly satisfies:

$0.30\text{ mm}<CT_2+CT_3<0.72\text{ mm}$;

wherein $CT_2$ is the central thickness of the second lens element; and $CT_3$ is the central thickness of the third lens element.

11. A photographing optical lens assembly comprising, in order from an object side to an image side:
    a first lens element with positive refractive power comprising a convex object-side surface;
    a second lens element with negative refractive power;
    a third lens element with positive refractive power comprising a convex object-side surface and a concave image-side surface, and both the object-side surface and the image-side surface of the third lens element being aspheric;
    a fourth lens element with positive refractive power comprising a convex object-side surface and a convex image-side surface; and
    a plastic fifth lens element with negative refractive power comprising an aspheric object-side surface, an aspheric image-side surface and at least one inflection point;
    wherein the photographing optical lens assembly satisfies the following condition:

$0.1<T_{34}/T_{45}<2.7$;

wherein $T_{34}$ is the axial distance between the third lens element and the fourth lens element; $T_{45}$ is the axial distance between the fourth lens element and the fifth lens element.

12. The photographing optical lens assembly according to claim 11, wherein the third lens element and the fourth lens element are made of plastic; the object-side surface and the image-side surface of the fourth lens element are aspheric and the image-side surface of the fifth lens element is concave.

13. The photographing optical lens assembly according to claim 11, wherein the photographing optical lens assembly satisfies:

$0.2<f_4/f<0.9$; and $-1.2<f_5/f<-0.2$;

wherein f is the focal length of the photographing lens assembly; $f_4$ is the focal length of the fourth lens element; $f_5$ is the focal length of the fifth lens element.

14. The photographing optical lens assembly according to claim 12, the photographing optical lens assembly satisfies:

$-1.0<(R1+R2)/(R1-R2)<0;$ wherein $R_1$ is the curvature radius of the object-side surface of the first lens element; $R_2$ is the curvature radius of the image-side surface of the first lens element.

15. The photographing optical lens assembly according to claim 12, wherein the photographing optical lens assembly satisfies the following condition:

$0<R_5/R_6<3.2;$ wherein $R_5$ is the curvature radius of the object-side surface of the third lens element; $R_6$ is the curvature radius of the image-side surface of the third lens element.

16. The photographing optical lens assembly according to claim 12, wherein the photographing optical lens assembly satisfies:

$30<V1-V2<42;$ wherein $V_1$ is the Abbe number of the first lens element; $V_2$ is the Abbe number of the second lens element.

17. The photographing optical lens assembly according to claim 12, wherein the photographing optical lens assembly satisfies:

$0.30 \text{ mm}<CT_2+CT_3<0.72 \text{ mm};$ wherein $CT_2$ is the central thickness of the second lens element; $CT_3$ is the central thickness of the third lens element.

18. The photographing optical lens assembly according to claim 12, wherein the photographing optical lens assembly satisfies:

$0.1<T_{34}/T_{45}<2.4.$

19. A photographing optical lens assembly comprising, in order from an object side to an image side:
   a first lens element with positive refractive power;
   a second lens element with negative refractive power;
   a third lens element with refractive power comprising a convex object-side surface and a concave image-side surface, and both the object-side surface and the image-side surface of the third lens element being aspheric;
   a fourth lens element with positive refractive power comprising a convex object-side surface and a convex image-side surface; and
   a plastic fifth lens element with negative refractive power comprising an aspheric object-side surface and an aspheric concave image-side surface;
   wherein the photographing optical lens assembly satisfies the following condition:

$0<R_5/R_6<3.2;$ and $0.30 \text{ mm}<CT_2+CT_3<0.72 \text{ mm};$ wherein $R_5$ is the curvature radius of the object-side surface of the third lens element; $R_6$ is the curvature radius of the image-side surface of the third lens element; $CT_2$ is the central thickness of the second lens element; and $CT_3$ is the central thickness of the third lens element.

20. The photographing optical lens assembly according to claim 19, wherein fifth lens element further comprises at least one inflection point.

21. The photographing optical lens assembly according to claim 19, wherein the photographing optical lens assembly satisfies:

$30<V1-V2<42;$ wherein $V_1$ is the Abbe number of the first lens element; $V_2$ is the Abbe number of the second lens element.

22. The photographing optical lens assembly according to claim 20, wherein the photographing optical lens assembly satisfies:

$|f/f_3|<0.65;$ wherein f is the focal length of the photographing lens assembly; $f_3$ is the focal length of the third lens element.

23. The photographing optical lens assembly according to claim 20, wherein the photographing optical lens assembly satisfies:

$0.1<T_{34}/T_{45}<2.7;$ $T_{34}$ is the axial distance between the third lens element and the fourth lens element; $T_{45}$ is the axial distance between the fourth lens element and the fifth lens element.

24. The photographing optical lens assembly according to claim 20, wherein the photographing optical lens assembly satisfies:

$-1.0<(R1+R2)/(R1-R2)<0$ wherein $R_1$ is the curvature radius of the object-side surface of the first lens element; $R_2$ is the curvature radius of the image-side surface of the first lens element.

* * * * *